April 5, 1960 C. B. TRIMBLE 2,931,571

MAGNETIC STORAGE OF MULTIPLE TOTALS

Filed April 11, 1951 16 Sheets-Sheet 1

INVENTOR
CEBERN B. TRIMBLE

BY Earl Beust

Louis A. Kline

HIS ATTORNEYS

April 5, 1960 C. B. TRIMBLE 2,931,571

MAGNETIC STORAGE OF MULTIPLE TOTALS

Filed April 11, 1951 16 Sheets-Sheet 2

INVENTOR
CEBERN B. TRIMBLE

BY Carl Beust
Louis A. Kline
HIS ATTORNEYS

INVENTOR
CEBERN B. TRIMBLE
BY Earl Beust
Louis A. Kline
HIS ATTORNEYS

INVENTOR
CEBERN B. TRIMBLE
BY Earl Beust
Louis A. Kline
HIS ATTORNEYS

INVENTOR
CEBERN B. TRIMBLE
BY Earl Bennett
Louis A. Kline
HIS ATTORNEYS

INVENTOR
CEBERN B. TRIMBLE
BY Earl Bennett
Louis A. Kline
HIS ATTORNEYS

INVENTOR
CEBERN B. TRIMBLE
BY Earl Bennett
Louis A. Kline
HIS ATTORNEYS

INVENTOR
CEBERN B. TRIMBLE
BY Earl Beust
Louis A. Kline
HIS ATTORNEYS

MAGNETIC STORAGE OF MULTIPLE TOTALS

Filed April 11, 1951 16 Sheets-Sheet 9

INVENTOR
CEBERN B. TRIMBLE
BY Earl Bennett
Louis A. Kline
HIS ATTORNEYS

April 5, 1960 C. B. TRIMBLE 2,931,571

MAGNETIC STORAGE OF MULTIPLE TOTALS

Filed April 11, 1951 16 Sheets-Sheet 10

INVENTOR
CEBERN B. TRIMBLE
BY Earl Bunst
Louis A. Kline
HIS ATTORNEYS

INVENTOR
CEBERN B. TRIMBLE
BY Karl Benst
Louis A. Kline
HIS ATTORNEYS

April 5, 1960 C. B. TRIMBLE 2,931,571

MAGNETIC STORAGE OF MULTIPLE TOTALS

Filed April 11, 1951 16 Sheets-Sheet 12

INVENTOR
CEBERN B. TRIMBLE
BY Hearl Beust
Louis A. Kline
HIS ATTORNEYS

INVENTOR
CEBERN B. TRIMBLE
BY Earl Bennett
Louis A. Kline
HIS ATTORNEYS

INVENTOR
CEBERN B. TRIMBLE
BY Carl Beust
Louis A. Kline
HIS ATTORNEYS

INVENTOR
CEBERN B. TRIMBLE
BY Earl Bunt
Louis A. Kline
HIS ATTORNEYS

April 5, 1960 C. B. TRIMBLE 2,931,571

MAGNETIC STORAGE OF MULTIPLE TOTALS

Filed April 11, 1951 16 Sheets-Sheet 16

INVENTOR
CEBERN B. TRIMBLE
BY Earl Beust
Louis A. Kline
HIS ATTORNEYS

United States Patent Office 2,931,571

Patented Apr. 5, 1960

2,931,571

MAGNETIC STORAGE OF MULTIPLE TOTALS

Cebern B. Trimble, Dayton, Ohio, assignor to The National Cash Register Company, Dayton, Ohio, a corporation of Maryland Application April 11, 1951, Serial No. 220,473

24 Claims. (Cl. 235—173)

This invention relates to the magnetic storage of data, and in particular to an apparatus in which a plurality of amounts can be stored in the form of discrete magnetic spots or marks and in which any desired stored amount can be withdrawn from storage, an additional amount added to or subtracted therefrom, as desired, and the resulting amount stored in the place of the previously stored amount which was used in the particular operation.

This invention will be explained with reference to the storage of amounts in the decimal notation, but it will be obvious from the following description that amounts in other notations and other data may be stored equally well and be withdrawn from storage and restored thereto as desired.

The apparatus constituting the preferred embodiment of the invention includes a rotatable cylinder having thereon a plurality of circumferential storage elements of magnetic material disposed longitudinally of the cylinder, each of which elements can have stored along its length, in predetermined zones or arcs about the cylinder, the various digits of an eight-denominational amount.

The apparatus also includes an electronic accumulator in which amounts may be preset or set up directly under manual control and into which amounts may be entered additively from the storage elements.

A magnetic reading and recording head is provided to cooperate with any selected storage element. The reading and recording head can be controlled to operate as a reading means, so that, as the cylinder is rotated, the stored amount can be read digit by digit from the selected storage element as it passes the reading and recording head. The amount, thus, read, can be entered into the proper denominational orders of the accumulator to be combined therein with other data as desired.

Further means in the apparatus are operable to read out the amount in the accumulator and to control the reading and recording head to operate as a recording means to magnetically record that amount on a storage element.

In order that a new amount may be either added to or subtracted from a stored amount, manual amount entry control means are provided which can be set to the new amount and can enter or preset the new amount in the accumulator if addition is desired and can enter or preset the complement of the new amount in the accumulator if subtraction is desired.

The novel storage means has the advantage that it is very compact and enables a large number of multi-digit amounts to be stored in a very small space; for instance, about one hundred amounts of eight denominations each can be stored on a cylinder about two and a half inches in diameter and about five inches long.

The novel apparatus has the advantage that stored amounts can be withdrawn from storage and combined with further amounts, and the resulting amounts can be stored, all in a very short time.

It is an object of the invention, therefore, to provide a compact storage means for storing a large number of multi-digit amounts in the form of magnetic representations.

A further object of the invention is to provide a novel amount storage means in which the digits of the amounts are stored in the form of corresponding numbers of discrete magnetic signals located on the storage means in proper denominational positions.

A further object of the invention is to provide a novel amount storage means from which stored amounts can readily be withdrawn and in which amounts can readily be stored.

A further object of the invention is to provide an electronic accumulator into which an amount to be combined with a stored amount can be directly preset and into which the stored amount can readily be entered to be combined with the preset amount, said accumulator also controlling the storage of the combined amount in the storage means.

A further object of the invention is to provide a source of readout impulses which operate in synchronism with the storage means and which can operate the accumulator in a readout operation to enable amounts in the accumulator to be transferred to the storage means and stored therein.

A further object of the invention is to provide novel controls for an electronic accumulator to enable it to be operated in response to positive and negative impulses.

A further object of the invention is to provide an electronic accumulator with controls whereby certain amounts may be preset therein by presetting or directly operating tubes corresponding to those amounts, and other amounts may be entered therein by sequential operation of the tubes in response to signals from an amount storage means.

With these and incidental objects in view, the invention includes certain novel features of construction and combinations of parts, a preferred form or embodiment of which is hereinafter described with reference to the drawings which accompany and form a part of this specification.

Figs. 5, 6, 7, and 8 show details of routing and control switches in the storage apparatus.

Figure 9:
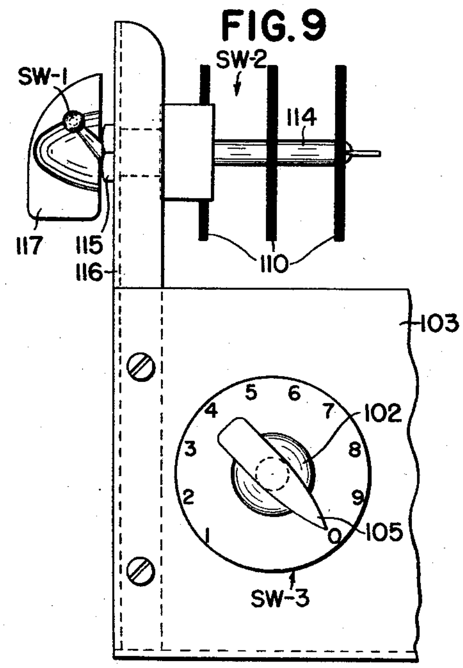

Fig. 9 is a view of the "On-Off" switch, an amount entry control switch which controls the amount of the preset entry, and an "Add-Subtract" control switch which controls whether the entry in the accumulator is to be made additively or subtractively.

Figure 10:
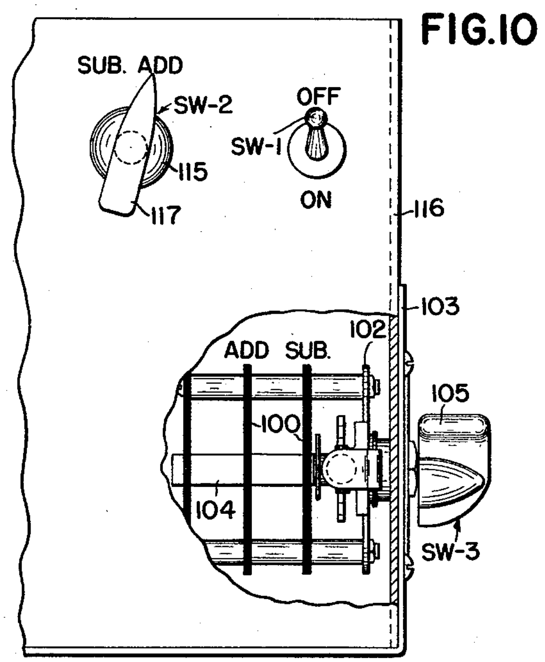

Fig. 10 is another view of the switches shown in Fig. 9.

Figures 11, 12, 13, 14:
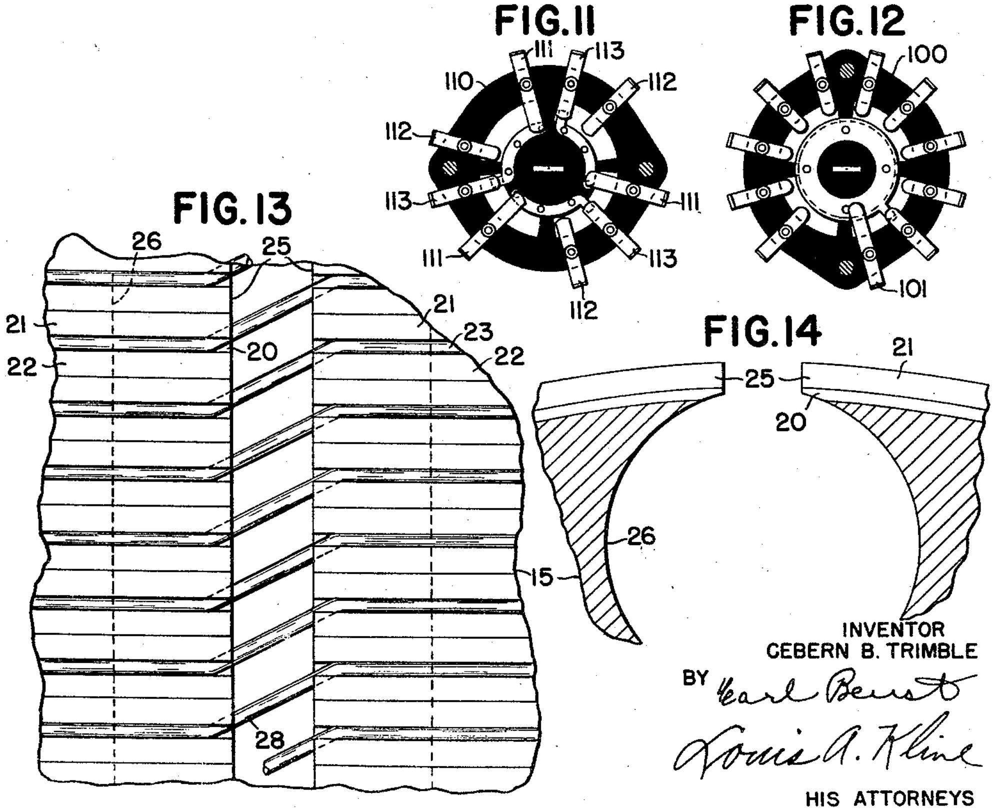

Fig. 11 shows details of the switch for controlling the entries for addition or subtraction.

Fig. 12 is a view showing details of one of the manually operable amount entry control switches.

Fig. 13 is an enlarged top plan view of a portion of the cylinder upon which the amounts are stored, showing the manner in which the storage elements are formed on the cylinder.

Fig. 14 is an enlarged sectional view of a portion of the cylinder with the storage elements omitted.

Figure 15:
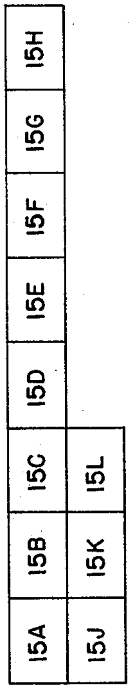

Fig. 15 is a diagram showing how Figs. 15A to 15H and 15J to 15L are to be arranged.

Figs. 15A to 15H and 15J to 15L provide a diagram of the circuits used in the apparatus and a schematic showing of the storage elements and readout impulse generating means.

Figure 16A:
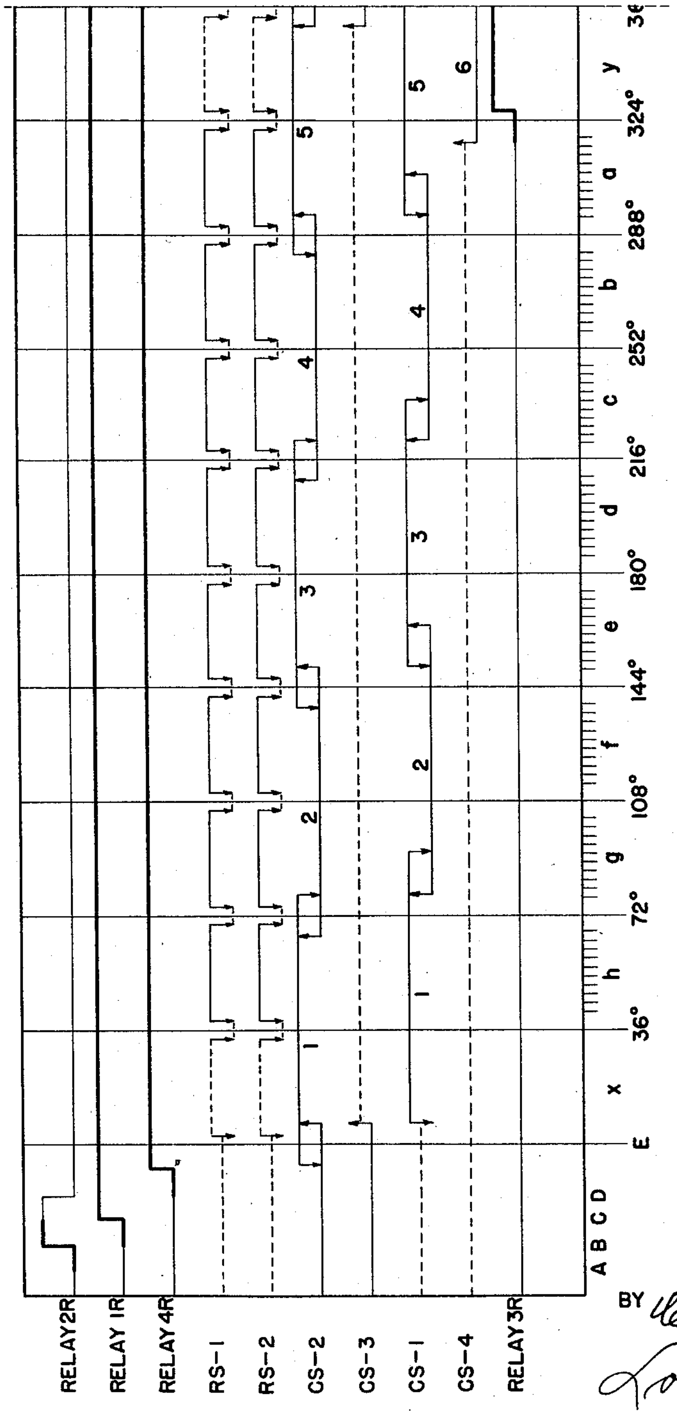
Figure 16B:
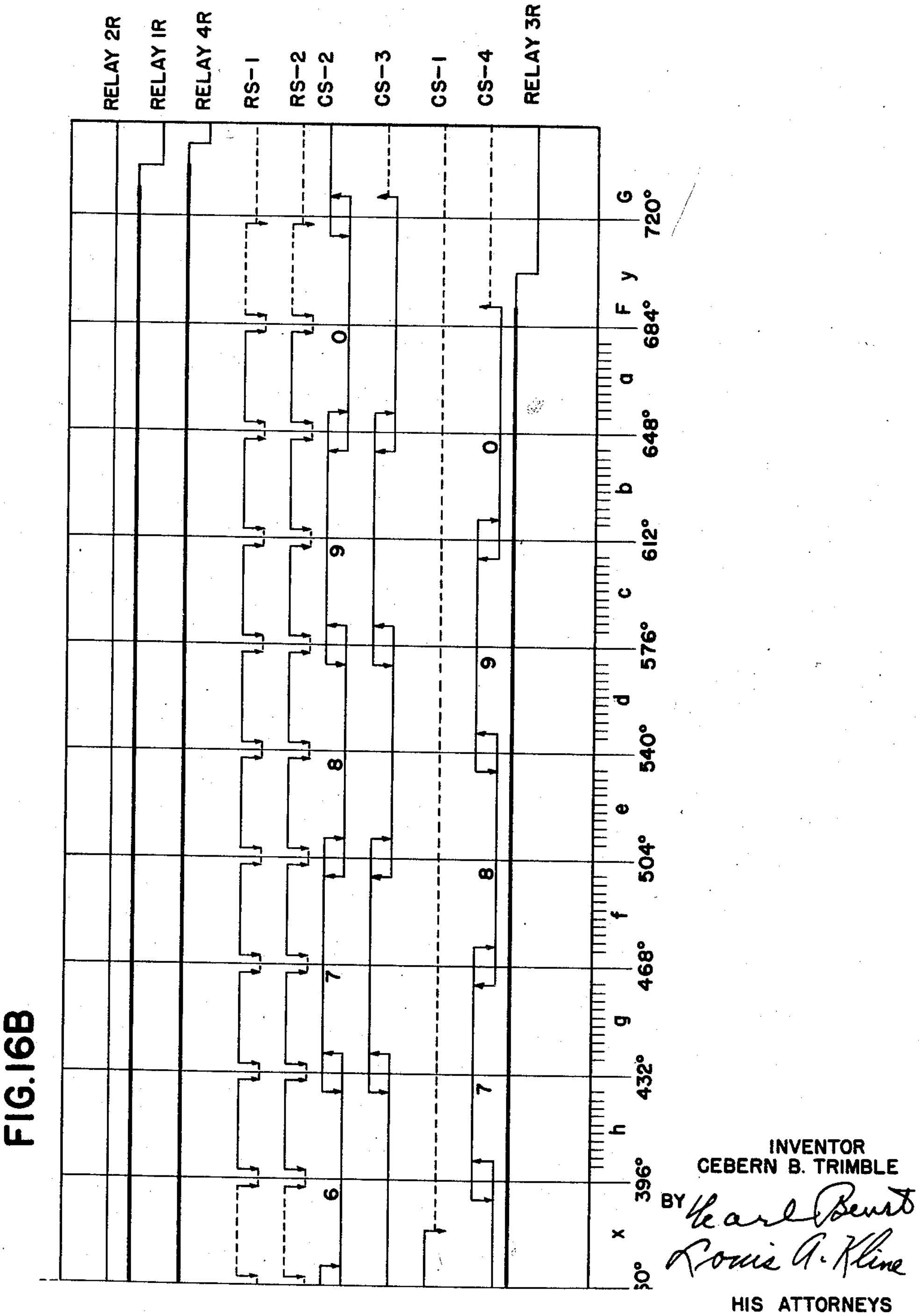

Figs. 16A and 16B are a sequence chart showing the controls which take place at different times during an operation of the apparatus.

*General description*

In general, the novel apparatus includes a storage means upon which a plurality of multi-digit amounts may be stored, means to operate the storage means during the reading of amounts therefrom and during the storage of amounts therein, magnetic heads cooperating with the storage means to read amounts therefrom and store amounts thereon, an accumulator in which amounts can be preset or entered directly to be added to or subtracted from a stored amount, and means for enabling the accumulator to control the storage of an amount standing therein.

In the embodiment being described to explain the invention, the storage means includes one hundred circumferential storage elements or bands of magnetic material spaced longitudinally along a rotatable supporting cylinder of non-magnetic material, each of the storage elements having a capacity for storing the digits of an eight-denominational order amount, the digits of an amount being stored in the form of a corresponding number of magnetic spots for each digit and located along the element according to their denominational position in the amount. It is to be understood that the storage means is not limited to the storage of one hundred amounts, as a larger or smaller number of storage elements may be provided, as desired, nor is it limited to the use of a separate storage element for each amount but may be formed otherwise, as by coating the cylinder with magnetizable material and allotting areas of the coated surface for the storage of amounts. Further, the apparatus having the eight-denominational order capacity is merely illustrative and can be arranged to deal with other denominational order capacities, if desired, without departing from the invention.

In each operation of the apparatus, a driving means drives the cylinder continuously through two rotations, the first rotation of the cylinder being utilized to enable a stored amount to be read from a selected storage element and the second rotation being utilized to enable an amount to be stored on the element.

A reading and recording magnetic head and an erasing head are mounted in a movable support, so that they can be moved into cooperative relation with any one of the storage elements of magnetic material. During the first rotation of the cylinder, the reading and recording head is controlled to perform its reading function and reads the amount from the selected element, digit by digit, as the element is moved past it, and causes the amount to be entered into an accumulator. The erasing head trails the reading and recording head and is controlled to erase the stored amount, digit by digit, from the element during the first rotation of the cylinder just after the reading and recording head has read these digits. During the second rotation of the cylinder, the reading and recording head is controlled to perform its recording function and is effective to record on the cleared storage element the amount in the accumulator.

Routing switches are driven in timed relation with the cylinder to cause entry of the read digits to be made in proper orders of the accumulator during the first rotation of the cylinder and to enable the recording of the digits in the various denominations of the accumulator in proper location of the storage element during the second rotation of the cylinder.

Since the eight denominational order capacity is provided in the storage of amounts, eight denominational orders are provided in the electronic accumulator. Each order of the accumulator includes an entry device including a flip-flop circuit, a ring of ten gaseous tetrodes operable step by step in sequence, and a pair of control tubes which are controlled by the ring in read-out operations to control the storage of an amount standing in the ring at that time. Tens transfer means interconnects the various orders of the accumulator.

If desired, an indicator in the form of a glow lamp for each of the tubes of the rings may be associated with the accumulator. The lamps corresponding to the tubes which are conducting in the several rings will glow and provide a visible indication of the amount standing in the accumulator at any stage of its operation.

Also associated with each ring of the accumulator is a manually-operable amount entry control switch which can be set according to the new amount to be combined with the stored amount. The switch for each ring has two parts, one part which is rendered operable to cause the tube corresponding to the setting of the switch to be fired when the new amount is to be added to the stored amount, and another part which is rendered operable to cause the tube corresponding to the "nines" complement of the setting of the switch to be fired when the new amount is to be subtracted from the stored amount.

An "Add-Subtract" switch is provided to select which sections of the manually operable amount entry control switches will control the accumulator, and an "On-Off" switch and associated controls are provided which when operated to "On" will cause operating potential to be supplied to the accumulator to render the accumulator operable and will cause the manually operable switches to be momentarily effective to preset the accumulator according to their setting or the complement of their setting as controlled by the "Add-Subtract" switch. When the "On-Off" switch is set to its "Off" position, it will remove operating potential from the ring and thereby clear the accumulator for another problem.

In order to read out amounts from the accumulator and store these amounts on proper denominational portions of the storage elements, an impulse-generating means is provided for generating read-out impulses. This means is operated in synchronism with the rotation of the cylinder and ten impulses are sent to each denominational order of the accumulator in sequence as the related denominational portion of the storage element is passing the reading and recording head, and these impulses will cause the rings of tubes to be operated in succession, driving the tubes in each ring from any setting, completely around the ring, and restoring the ring to the setting which it had before the ten impulses were applied thereto. During this operation of the ring, when the "0" tube operates, it will cause the pair of control tubes related to that ring to become effective and enable the further impulses, which are applied to the ring after the "0" tube operates, to be sent to the reading and recording head, which operates at this time as a recording head to apply a corresponding number of spots to the proper portion of the storage element. During this read-out operation, the tens transfer means is disabled to prevent unwanted tens transfers which would occur as the rings were driven through zero to render the control tubes effective.

The manner in which the apparatus is operated is as follows. Before the cylinder is set in operation, the manually operable amount entry control switches are set according to the new amount, the "Add-Subtract" switch is set according to whether the new amount is to be added or subtracted, and then the "On-Off" switch is set to "On." The operation of the "On-Off" switch causes operating potential to be supplied to the accumulator and causes the manually-operable amount entry control switches to be made effective momentarily to cause the tubes of the rings corresponding to the amount, or its complement, as the case may be, to become conducting, thereby introducing this value into the accumulator. Also the reading and recording head and the erasing head are placed in cooperative relation with the storage element on which the amount to be combined with the new amount has been stored.

The driving means for the cylinder is then rendered operative to drive the cylinder through two rotations. During the first rotation of the cylinder, each of the magnetic spots making up the digits of the stored amount will generate an impulse in the reading and recording head, which impulses are amplified and are routed to the proper denominational orders of the accumulator to cause the step-by-step operation of the tubes of the rings therein to add the stored amount to the preset amount. The erasing head is effective in the first rotation to erase the stored amount after it has been read from the storage element. At the end of the first rotation of the cylinder, the stored amount has been read therefrom and has been combined with the amount which was preset in the accumulator.

The second rotation of the cylinder immediately follows the first. In the second rotation, the read-out impulse generating means sends a group of ten read-out impulses to each of the orders of the accumulator in sequence and in timed relation with the passage of the storage element past the reading and recording head, which head is now controlled as a recording means. As each denominational portion of the storage element passes the recording head, the group of impulses will be sent to the corresponding denomination of the accumulator to cause the ring of that denomination to operate from the digit-representing condition in which the ring stands, through zero, and back to the starting digit-representing condition. When the "0" tube in the ring operates, it causes the related control tubes to become effective to pass the remaining impulses of the group to the recording head to cause a corresponding number of magnetic spots to be recorded on that portion of the storage element. Accordingly, as successive portions of the storage element pass the recording head and the groups of impulses are sent to the corresponding denominations of the accumulator, the required number of magnetic spots will be recorded on each portion according to the digit registered in the related denomination of the accumulator, thereby storing on the storage element the amount standing on the accumulator.

The drive for the cylinder is interrupted when the cylinder completes its second rotation.

At the end of the operation of the cylinder, the "On-Off" switch is operated to "Off" position to remove operating potential from the accumulator to clear it of the amount standing thereon and prepare it for a further presetting operation.

Variations on the above mode of operation will enable the amount stored on any storage element to be ascertained and will also enable the amount to be cleared from the storage element.

For instance, when it is desired to ascertain the amount which is stored on any storage element, zeros are preset in the accumulator under control of the manually operable amount entry control switches, and the cylinder is cycled to read out the stored amount and enter it in the accumulator. At the end of the first rotation of the cylinder, the stored number will be standing on the accumulator and can be read by observing the indicating glow lamps. In the second rotation of the cylinder, the amount in the accumulator is again stored on the element, thereby returning to the storage element the amount which was read therefrom in the first rotation of the cylinder. The amount is still retained in the accumulator at the end of this second rotation and can again be ascertained by reading the glow lamps. The amount will remain in the accumulator until the accumulator is cleared in an accumulator-clearing operation.

In order to clear an amount from a storage element, the cylinder is cycled without potential having been applied to the accumulator. Under these conditions, the impulses which are generated during the reading of the amount will be ineffective on the accumulator, so that during the second rotation of the cylinder none of the read-out impulses will be effective to record amounts, thereby leaving the element, which was cleared during the first rotation, in its cleared condition.

*Detailed description*

The amount storage cylinder, its driving means, and its associated parts are shown in Figs. 1, 2, 4 to 8, 13, 14, and 15L.

The cylinder 15 (Figs. 1 and 4) is secured to a shaft 16, which is rotatably supported by side frames 17 and 18, suitably secured to a base member 19.

The construction of the cylinder 15 and the storage elements thereon will now be explained with reference to Figs. 2, 4, 13, 14, and 15L. The cylinder 15 is made of non-magnetic material and has formed therein a plurality of parallel circumferential grooves 20. Each of the grooves is flanked by a pair of slanting guide surfaces 21 and 22 (Fig. 2) for guiding the various heads in their relation with the storage elements. Amount storage elements, as 23, consist of bands of magnetic material which lie in the grooves 20 and extend circumferentially about the cylinder. Fig. 15L includes a diagrammatic representation of one of the amount storage elements 23 and shows how different portions of the element about the cylinder are assigned to receive digit entries in the eight denominations in succession, as shown by the portions opposite the angle "*a*" through "*h*," the digit entry in each denominational order being in the form of a plurality of discrete magnetized spots or marks corresponding in number to the digit which is stored. The digit "nine" would be stored by a spot in each of the locations indicated on the element, the digit "eight" would be stored by a spot in each of the locations "8" through "1" as indicated, etc., with the digit "one" being stored by a spot in the location indicated by "1." As the cylinder is rotated, the various denominational portions of the element will move past a reading and recording point in succession, so that stored amounts can be read or amounts can be stored on the element.

The storage elements 23 and the means for securing them on the cylinder may take various forms. In the preferred embodiment of the invention, the several storage elements on the cylinder are formed from wire of copper-nickel-iron alloy sold by General Electric Company under the trade name "Cunife." In order to readily provide the plurality of storage elements and to secure them in the grooves on the cylinder, the preferred embodiment of the invention utilizes a single piece of wire to form the plurality of elements, which wire need not be secured to the cylinder for each element, but only the two ends of the wire need be secured to the cylinder to secure all the elements in place. The manner in which the plurality of storage elements can be formed from a single piece of wire is shown in the enlarged portions of the cylinder in Figs. 13 and 14. The cylinder 15 is formed with a slot 25 along its length, which slot communicates with a cylindrical opening 26. One end of the wire then extends from one side of the slot 25, around the cylinder in the first groove 20. After the wire is carried about the cylinder to form one storage element 23 and is adjacent the other side of the slot 25, it is bent over in the slot 25, as shown at 28 in Fig. 13, and is guided into the next adjacent groove 20 and about the cylinder to form another storage element 23. This process is continued until all the storage elements have been formed on the cylinder; then the other end of the wire is secured by a plug inserted in the other end of the opening 26. The slot 25 and the cylindrical opening 26 aid in the off-setting of the single wire, so that it can be placed in the plurality of parallel circumferential grooves 20 to form the plurality of storage elements 23.

It is to be noted that the upper fifth of the storage element 23, that part subtended by angles "*x*" and "*y*," as shown in Fig. 15L, is not used to store amounts, and it is in this portion of the element that the cross-over 28 is made.

Figures 4, 4A, 7, 8:
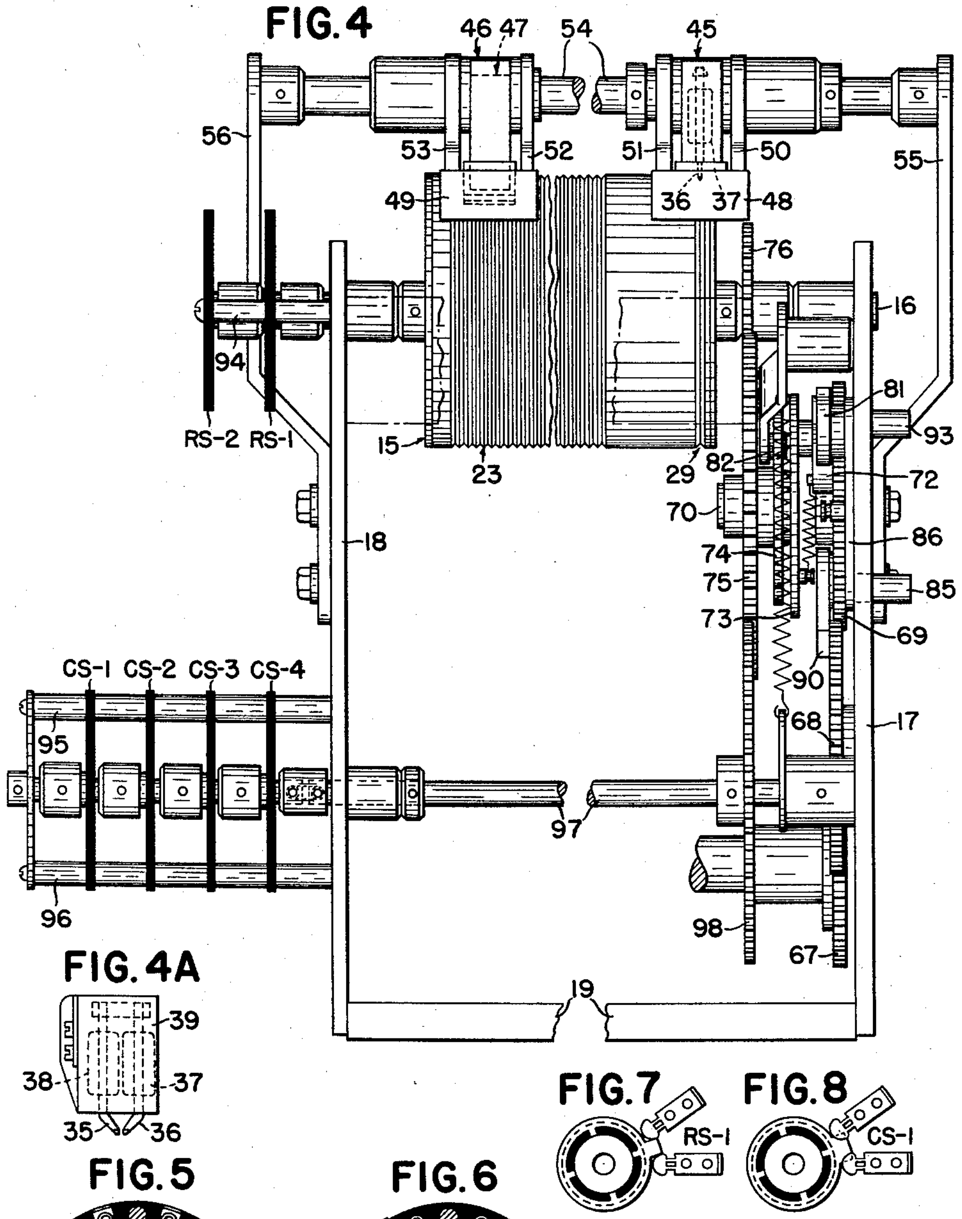
Fig. 4 is a front view of the apparatus of Fig. 1.
Fig. 4A is a view of a typical reading and recording head.

As a matter of convenience, the storage element which is the right-most element on the cylinder 15, as seen in Fig. 4, is used as an element 29 of the read-out impulse generating means. The storage element 29, as shown in Fig. 15L, has recorded thereon ten magnetic spots in each of the portions corresponding to the eight denominational portions of the amount storage elements, and these spots are used to generate groups of ten impulses to be sent to the various denominational orders of the accumulator during a read-out impulse generating operation in which the amount on the accumulator is being read therefrom and stored on a storage element. These spots are not erased in the operation of the apparatus but are used over and over in a plurality of amount storing operations. The manner in which the read-out impulse generating means functions in an amount storing operation will be explained hereinafter.

A plurality of electromagnetic reading and recording heads are associated with the storage elements. These heads are of similar construction, being provided with a magnetic circuit which includes two pole pieces (Fig. 4A), as 35 and 36, spaced apart to provide a small air gap at one end and coupled by a bar at their other end. Coils, as 37 and 38, are mounted on the pole pieces and can be connected in aiding series relation and to external circuits which control whether the head is to function as a reading head, a recording head, or an erasing head. The magnetic circuit and coils of the head are enclosed in a suitable protecting cover 39, from which the pole pieces as 35 and 36 extend.

When the head is to function as a reading head, the coils are controlled so that a voltage will be induced in the coils as each magnetic spot on the storage element moves past the pole pieces, and these induced voltages can be utilized as impulses to operate the accumulator, thereby enabling the amount on the storage element to be read therefrom and entered in the accumulator in a manner to be explained more fully hereinafter.

When the head is to be used as an amount-recording head, impulses are applied to the coils of such a polarity that they will produce a magnetic field sufficient to produce discernible magnetic spots on the storage element. When the head is to be used as an erasing head, it will be supplied with a direct current to produce a magnetic field of proper polarity and strength to overcome the magnetic spots which might be on the storage element.

Three heads are provided in the disclosed apparatus. These are (1) a read-out impulse generating means reading head 45, which cooperates with a storage element 29 to enable the magnetic spots thereon to generate read-out impulses as the cylinder rotates; (2) a reading and recording head 46, which can cooperate with any selected amount storage element to read the stored amount therefrom in the first rotation of the cylinder 15 and to store an amount on the element during the second rotation of the cylinder; and (3) an erasing head 47, which also cooperates with the selected amount storage element and is controlled to erase a stored amount after it has been read by the head 46 in the first rotation of the cylinder.

The head 45 is mounted on a guide element 48, and the reading and recording head 46 and the erasing head 47 are mounted on a guide element 49. As seen most clearly from Fig. 1, the erasing head 47 is displaced from the reading and recording head 46 a slight distance clockwise about the cylinder.

While in the instant embodiment the erasing head is displaced clockwise about the cylinder in relation to the reading and recording head in order to erase a stored amount during the first rotation of the cylinder after the amount has been read, it will be obvious that the erasing head could also be displaced counter-clockwise about the cylinder relative to the reading and recording head and be rendered effective during the second rotation of the cylinder to erase the stored amount just before the new amount is recorded thereon.

The guide element 48 is secured to arms 50 and 51 (Fig. 4), and the guide element 49 is secured to arms 52 and 53, which arms are provided with hubs by which they are pivotally supported on a rod 54, carried by extensions 55 and 56, secured, respectively, to the side frames 17 and 18. The arms 50 and 51 are held against lateral movement on the rod 54 to maintain the pole-pieces of the head 45 in alinement with the storage element 29 of the read-out impulse generating means. The arms 52 and 53 are slidable longitudinally of the rod 54 to enable the heads 46 and 47 on the guide element 49 to be associated with any of the amount storage elements 23.

Figure 1:
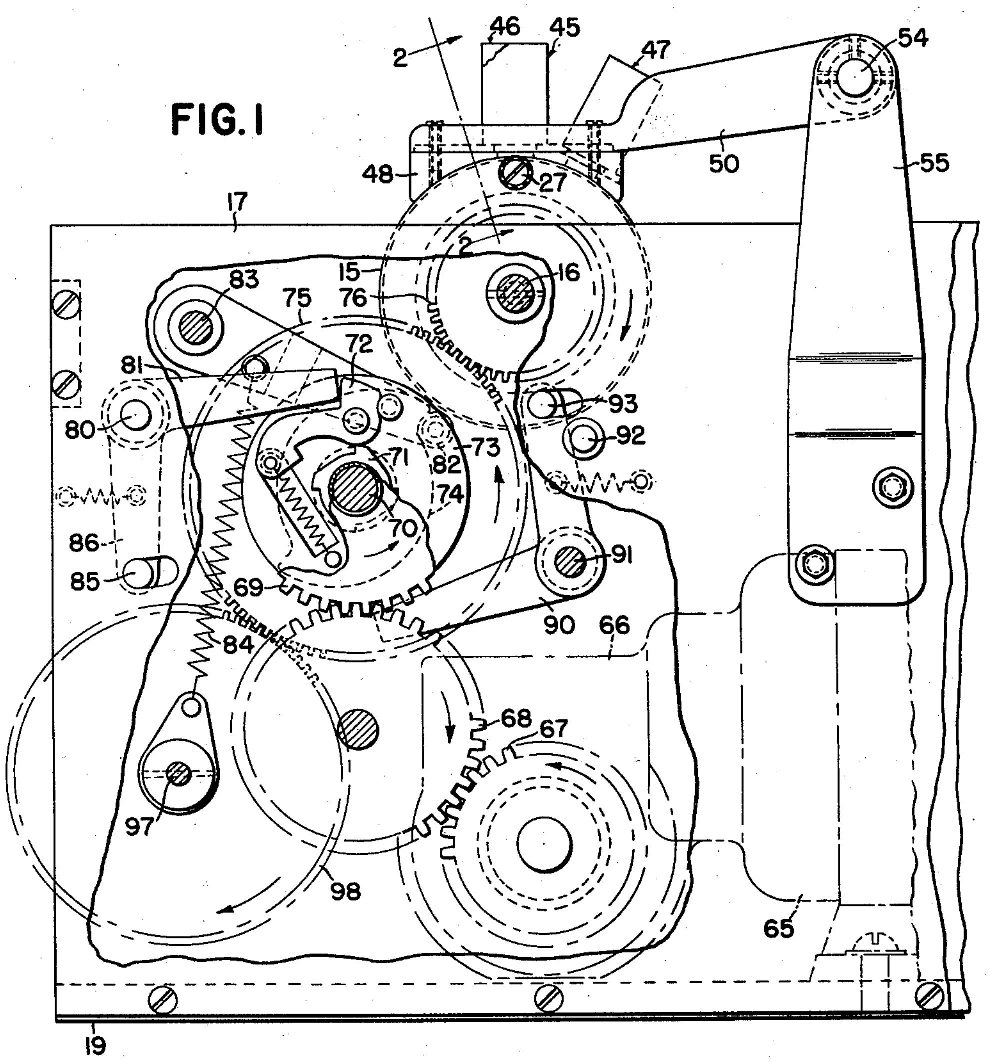
Fig. 1 is a right side elevation of the magnetic amount storage apparatus, certain parts being broken away to show other parts more clearly.
Figures 2, 3:
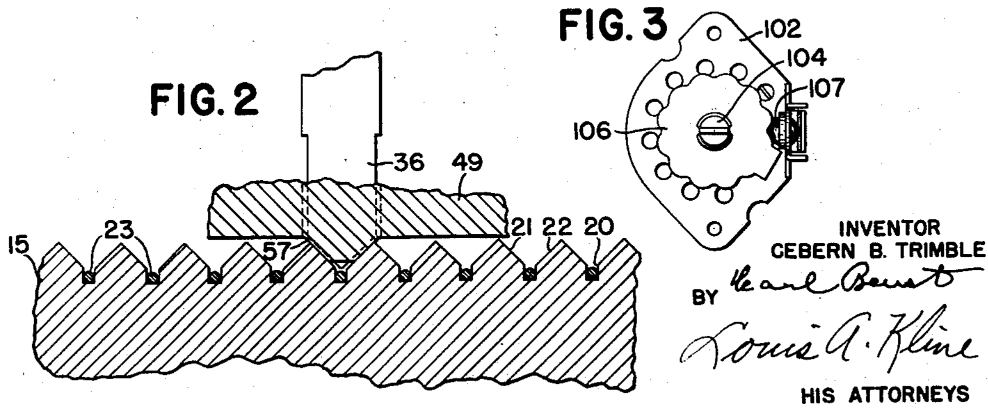
Fig. 2 is a section of a portion of a pole-piece of a magnetic reading and recording head and a section of a portion of a cylinder upon which amounts are stored, showing the cooperation between the head and the storage elements on the cylinder.
Fig. 3 shows a detent for the manually operable amount entry control switches.

The guide elements 48 and 49 have arcuate cylinder-engaging surfaces, as shown in Figs. 1, 2, and 4, from which extend a pair of lugs, as 57, which are in alinement with the pole pieces 35 and 36 and engage the guide surfaces 21 and 22 adjacent the selected storage element. The lugs 57 not only maintain the pole pieces in alinement with the selected storage element but also control the length of the air-gaps between the pole pieces and the storage element.

The driving means for rotating the cylinder includes a constantly-running motor 65 mounted on the base member 19 and connected through suitable reduction gearing 66 and gears 67 and 68 to the driving gear 69 of a clutch which is rotatably mounted on a stud 70 on the frame 17. Secured to the gear 69 is a driving ratchet 71, which can be engaged by a spring-urged pawl 72 on a plate 73 of the driven portion of the clutch. The driven portion of the clutch also includes a homing cam 74 and a gear 75, which meshes with a gear 76 secured to the shaft 16, on which the cylinder 15 is mounted. The ratio between the gears 75 and 76 is such that the cylinder 15 will make two rotations for each rotation of the driven portion of the clutch.

It is necessary that the cylinder have substantially uniform motion during the time the arcs which subtend the angles "*a*" through "*h*" are passing the reading and recording head. If, due to the inertia of the cylinder or other causes, there is hunting action during the rotation of the cylinder, so that the movement of the cylinder is not uniform when these arcs pass the head, a slight amount of friction applied to the shaft 16 by means of a brake or other equivalent arrangement will reduce the hunting and make the motion sufficiently uniform for proper sensing and recording operations.

A clutch trip lever including arms 81 and 86 is pivotally supported on a stud 80 on the frame 17 and is urged by a spring into its normal position, where one arm 81 thereof can engage the pawl 72, which is normally urged to engage the ratchet 71, and hold it out of engagement with the ratchet in the home position of the clutch. A cam follower 82, carried by an arm mounted on a stud 83 in the frame 17, is urged by a spring 84 to engage the homing cam 74 to assist in locating the driven portion of the clutch in home position.

A stud 85 on an arm 86 of the trip lever extends through a slot in the side frame 17 and enables the lever to be rocked to move arm 81 out of engagement with the pawl to render the drive for the cylinder effective. This stud 85, through its cooperation with the slot in the frame 17, also controls the extent of movement of the trip lever.

In order to be able to stop the cylinder after its first rotation, for testing or other purposes, a second trip lever 90 is provided to uncouple the clutch after it has made one half of a rotation. This trip lever is pivoted on a stud 91 on the frame 17 and is spring-urged into position to disengage the pawl 72 from the ratchet 71. The trip lever 90 is normally held in its ineffective position, as shown in Fig. 1, by a stud 92, which extends through an opening in the frame 17. However, when the stud 92 has been removed, the spring will move the lever 90 to its operative position, in which it can uncouple the pawl 72 from the ratchet after the clutch has made one half of a rotation. A formation on the homing cam 74 cooperates with the cam follower 82 to locate the driven portion of the clutch in this mid-position when it has been disconnected from the driving ratchet 71 by the engagement of the pawl 72 by the lever 90. The clutch, which has been thus disconnected, can be rendered operable to complete its second half rotation and return to its home position, by operating a stud 93 on the lever to move the trip lever out of operative engagement with the pawl in the same manner in which the clutch was rendered operable by the operation of the stud 85.

Figure 5:
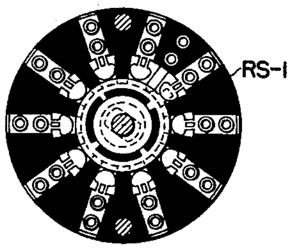
Figure 6:
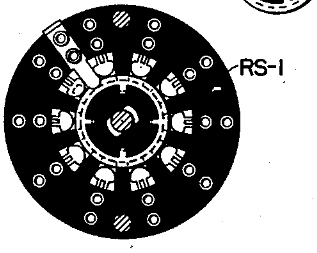

The shaft 16 extends through the side frame 18 and has secured thereto the rotors of two routing switches RS–1 and RS–2 (Figs. 4 and 15K), mounted on suitable mounting posts, as 94, and drives a non-bridging wiping contact of each switch past its related stationary contacts once for each rotation of the cylinder. Switch RS–1 is operable during both rotations of the cylinder. In the first rotation, it routes the digits of the stored number to proper orders of the accumulator, and in the second rotation it routes the groups of impulses from the read-out impulse generating means to the various orders of the accumulator. Switch RS–2 is effective during the second rotation of the cylinder to route impulses from the various denominations of the accumulator during the read-out operation and enables an amount which has been accumulated in the accumulator during the first rotation of the cylinder to be stored in proper location on the storage element during the second rotation of the cylinder. Front and rear views of one of the switches are shown in Figs. 5 and 6, and a view of the rotor having a non-bridging wiper contact is shown in Fig. 7.

A plurality of control switches CS–1, CS–2, CS–3, and CS–4 are also operated in timed relation with the rotation of the cylinder 15. These switches are similar to the type shown in Figs. 5 and 6 but have a bridging wiper contact on their rotors, as shown in Fig. 8. The stators of the switches CS–1, CS–2, CS–3, and CS–4 are mounted on posts 95 and 96, extending from the frame 18, and the rotors are driven by a shaft 97, which is rotatably mounted in the side frames 17 and 18 and is driven by a gear 98, which meshes with the gear 75 on the driven portion of the clutch. The ratio between the gears 98 and 75 is such that shaft 97 will make one rotation for each rotation of the clutch, so that the wiper contacts of these switches will traverse the stationary contacts once for each two rotations of the cylinder 15. These control switches serve to control the functioning of various parts of the apparatus during the operations of the cylinder, as will be more clear when the circuit and the timing diagrams are considered.

Severally manually-operable switches are provided to control the entry of amounts in the accumulator. These switches include (1) an "On-Off" switch SW–1 (Figs. 9, 10 and 15J), which is an ordinary toggle switch for controlling circuits for rendering the accumulator operable and also presetting of amounts in the accumulator; (2) an "Add-Subtract" switch SW–2 (Figs. 9, 10, 11, and 15J) for controlling whether an amount or its complement will be preset in the accumulator; and (3) a plurality of amount entry control switches SW–3, one of which is shown in Figs. 3, 9, 10, 12, and 15A, which are settable according to the amounts to be entered in the accumulator in the presetting operation.

According to the capacity of the apparatus of the disclosed embodiment, eight amount entry control switches are provided, as shown in Figs. 15A to 15H of the circuit diagram.

Each manually-operable amount entry control switch SW–3 consists of two parts, one part which is operable in adding operations for controlling the presetting of the amount to which the switch is set, and another part which is operable in subtracting operations for controlling the presetting of an amount which is the "nines" complement of the amount to which the switch has been set.

Each part of the switch SW–3 is like the one shown in Fig. 12, having a rotor with a non-bridging wiper contact carried by a stator 100, on which are ten contact elements, which correspond to the ten possible settings of the switch, and a further contact, as 101, for engaging the rotor in any rotational position thereof. The stators are mounted on suitable spacing posts on a fitting 102 (Figs. 3 and 10) secured to panel 103, which fitting rotatably supports a shaft 104 having a blade portion on which the rotors of the two parts of the switch are mounted. A handle 105, which is secured to the shaft, can turn the shaft and the rotors thereon to place the wiper contacts in engagement with the contacts on the stator according to the amount to be entered.

A detent plate 106 (Fig. 3), mounted on the shaft 104, cooperates with a spring-pressed ball 107 to locate the switch in any of its set positions and to prevent the switch from being set in any position other than the amount positions.

The "Add-Subtract" switch SW–2, which is settable to either "Add" position or "Subtract" position, is made up of three stators, as 110 (Fig. 9), each of which has thereon three groups of contacts (Fig. 11), one contact, as 111, of each group extending to a corresponding commutator segment connected to a non-bridging wiper contact on a rotor, and the other two contacts, as 112 and 113, being selectively engaged by the wiper in either of the two positions of the switch. The stators 110 of the switch SW–2 are mounted in spaced relation on suitable mounting posts, as 114, secured to a fitting 115, mounted in a panel 116. The rotors of the switch are secured to a blade formed on a shaft rotatably journaled in the fitting 115 and to which a suitable setting handle 117 is affixed.

When the handle 117 is in "Add" position, the wiper contacts on the rotors will engage contacts, as 112, in the several groups to connect contacts, as 111, to contacts, as 112. When the handle is in the "Subtract" position, the wiper contacts will connect contacts, as 111, to the contacts, as 113. Contacts, as 112, of the "Add-Subtract" switches are connected to contacts, as 101, on the "Add" portion of the amount entry control switches, and contacts, as 113, are connected to the contacts, as 101, on the "Subtract" portion of the amount entry control switches. In this manner, eight of the nine groups of three contacts are coupled to the manually-operable amount entry control switches to control which portion of the entry control switch will be effective according to whether the number set on the switches or its complement is to be preset in the accumulator. The remaining group of contacts in the "Add-Subtract" switch is used to control the entry of a value of "one" in the units order of the accumulator in subtracting operations to change the entry from the "nines" complement to the "tens" complement in this order, as will be explained more fully in connection with the circuit diagram.

The accumulator and the related circuits shown in the circuit diagram in Figs. 15A to 15H and 15J to 15L will now be described. In this description, certain values of potentials and values of circuit elements, such as resistors, and capacitors, will be given, and types of tubes will be specified. It is not intended, however, to limit the invention to the embodiment described nor to limit the circuit values and tube types to those specified, because these are merely selected as illustrative. It will be obvious that other potentials and/or other similar tube types can be used and the values of resistance and capacitance in the circuits can be adjusted to maintain the proper relation between various parts of the circuits. Throughout the circuit diagrams, the heater elements for the tubes are shown conventionally.

As explained earlier, the accumulator of the disclosed embodiment has a capacity of eight denominational orders, and the storage elements can store eight denominational amounts. In order to identify the denominations to which the various parts of the circuit diagram are related, the units denominational order of the accumulator will be shown in Fig. 15A, and circuits going from various parts of the diagram to this denomination will include the letter "*a*" in their designation; the tens denominational order of the accumulator will be shown in Fig. 15B, and the circuits going to this denomination will include the letter "*b*" in their designation, etc.

Figure 15A:
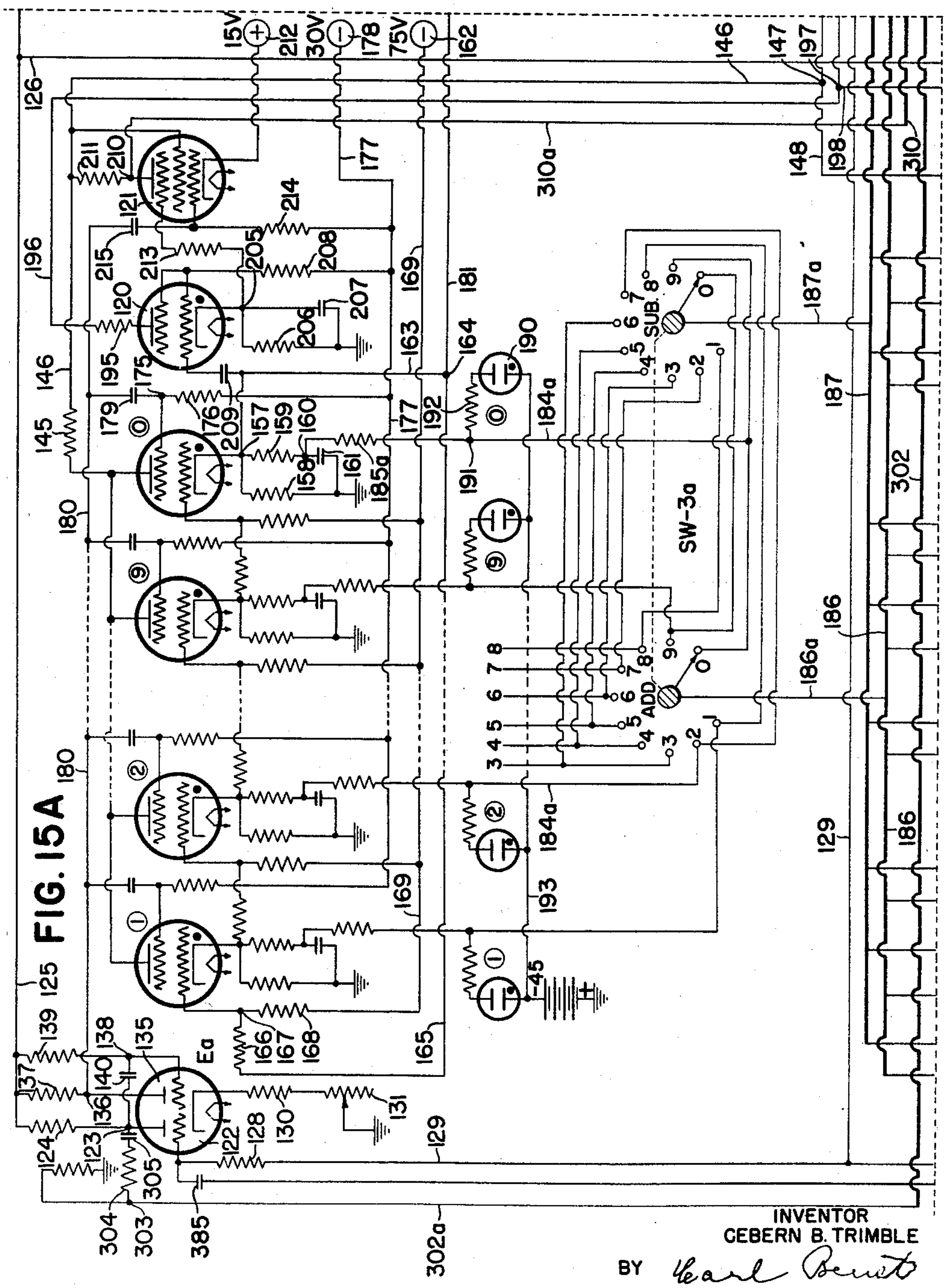
Figure 15B:
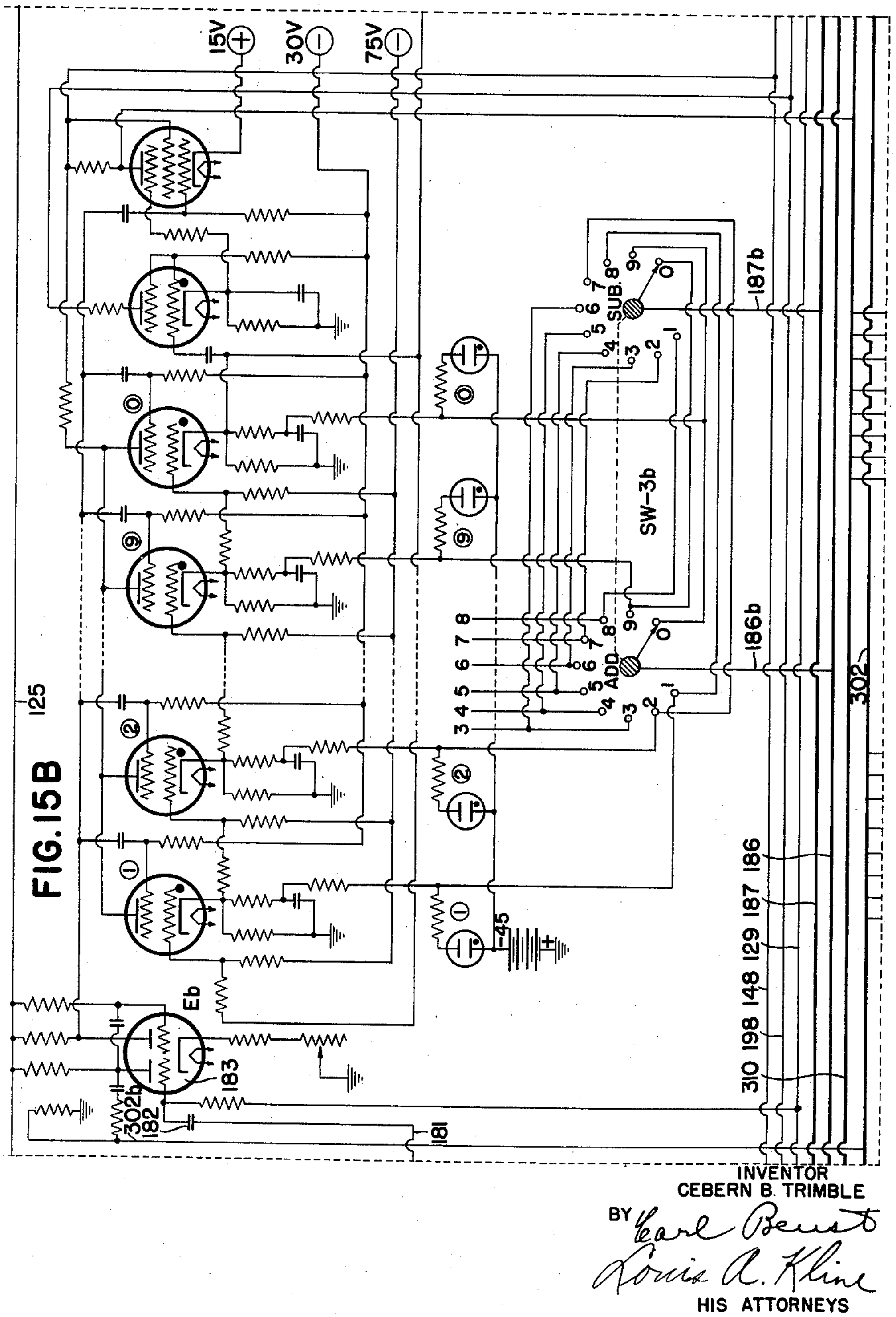
Figure 15C:
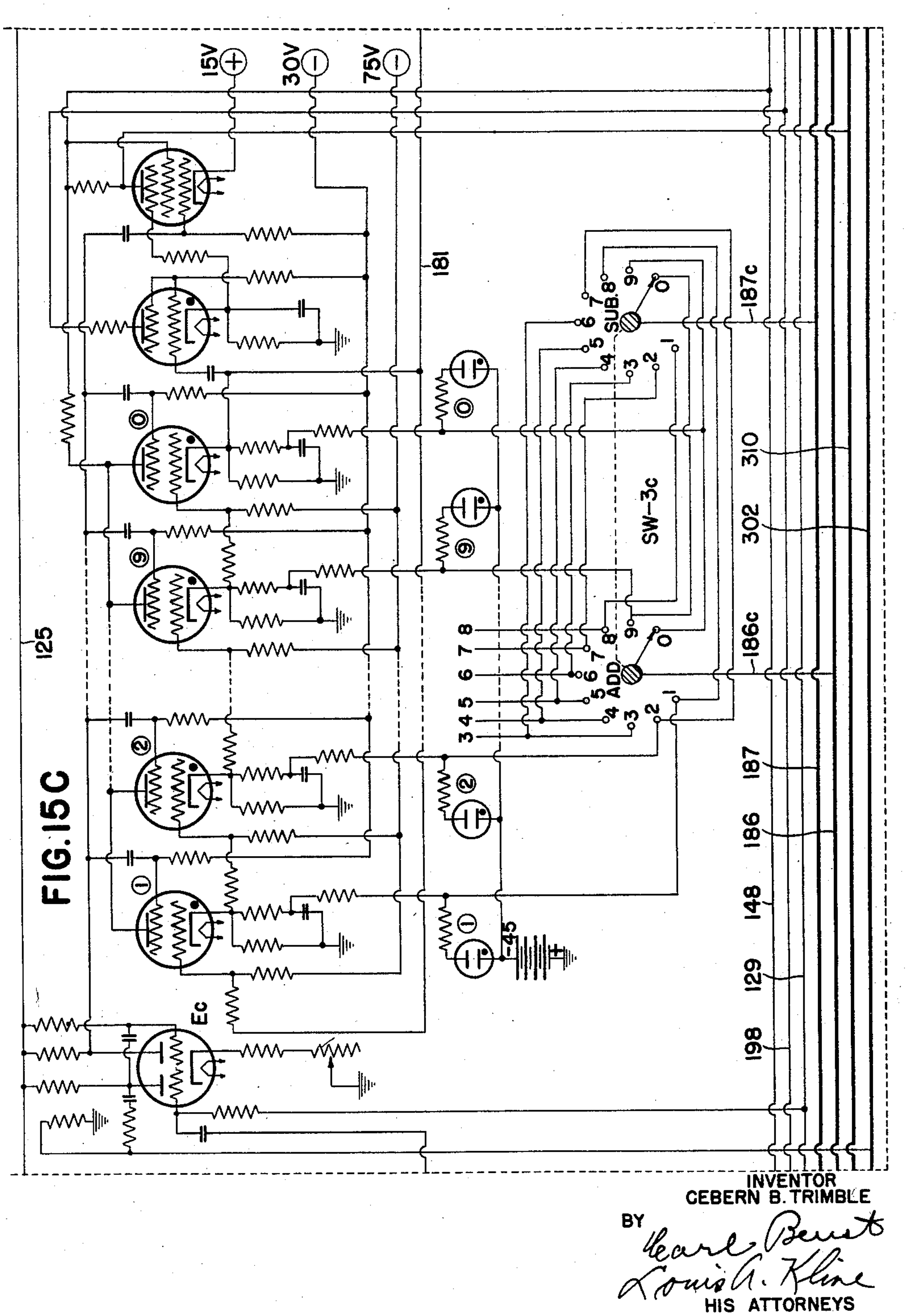
Figure 15D:
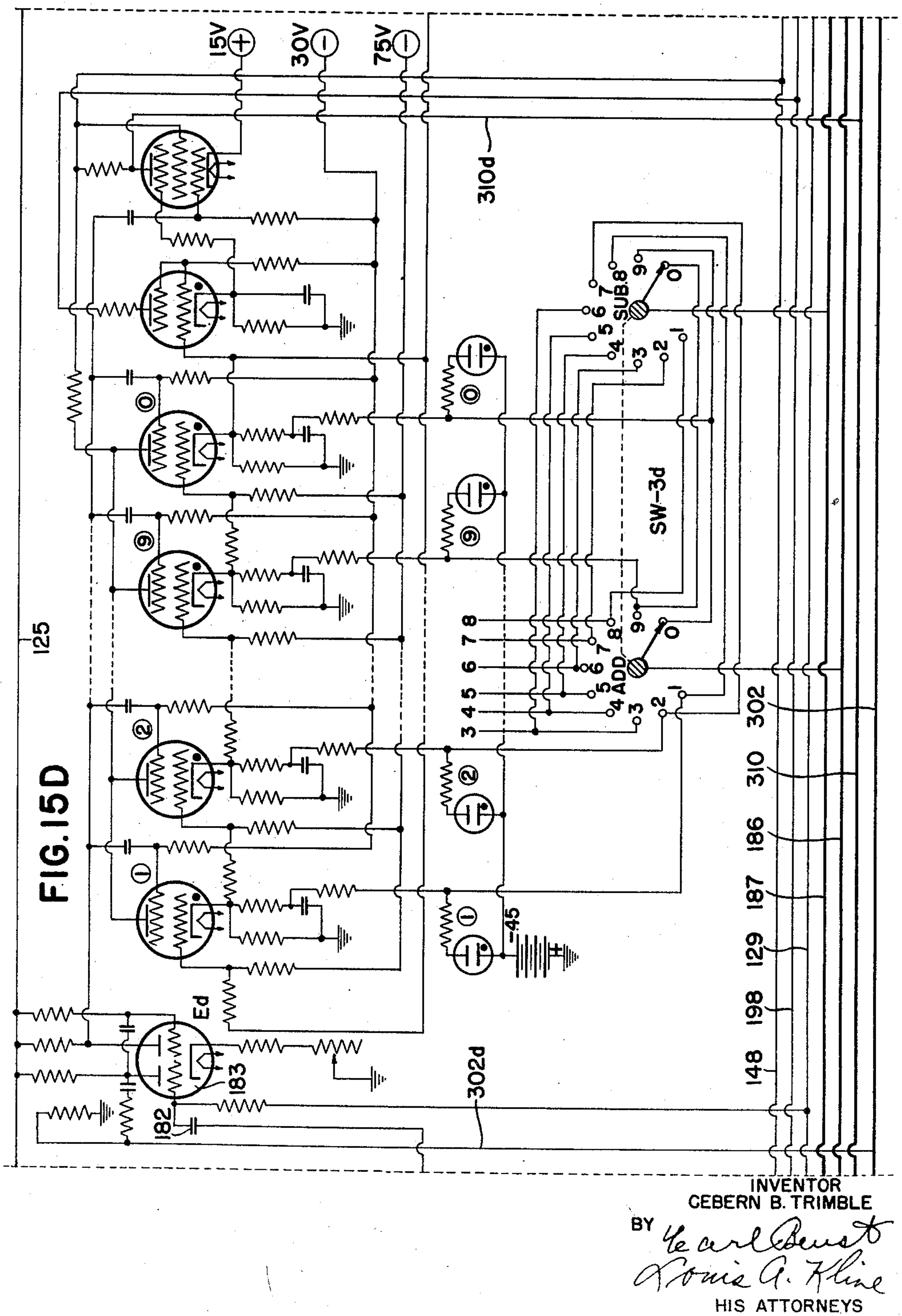
Figure 15E:
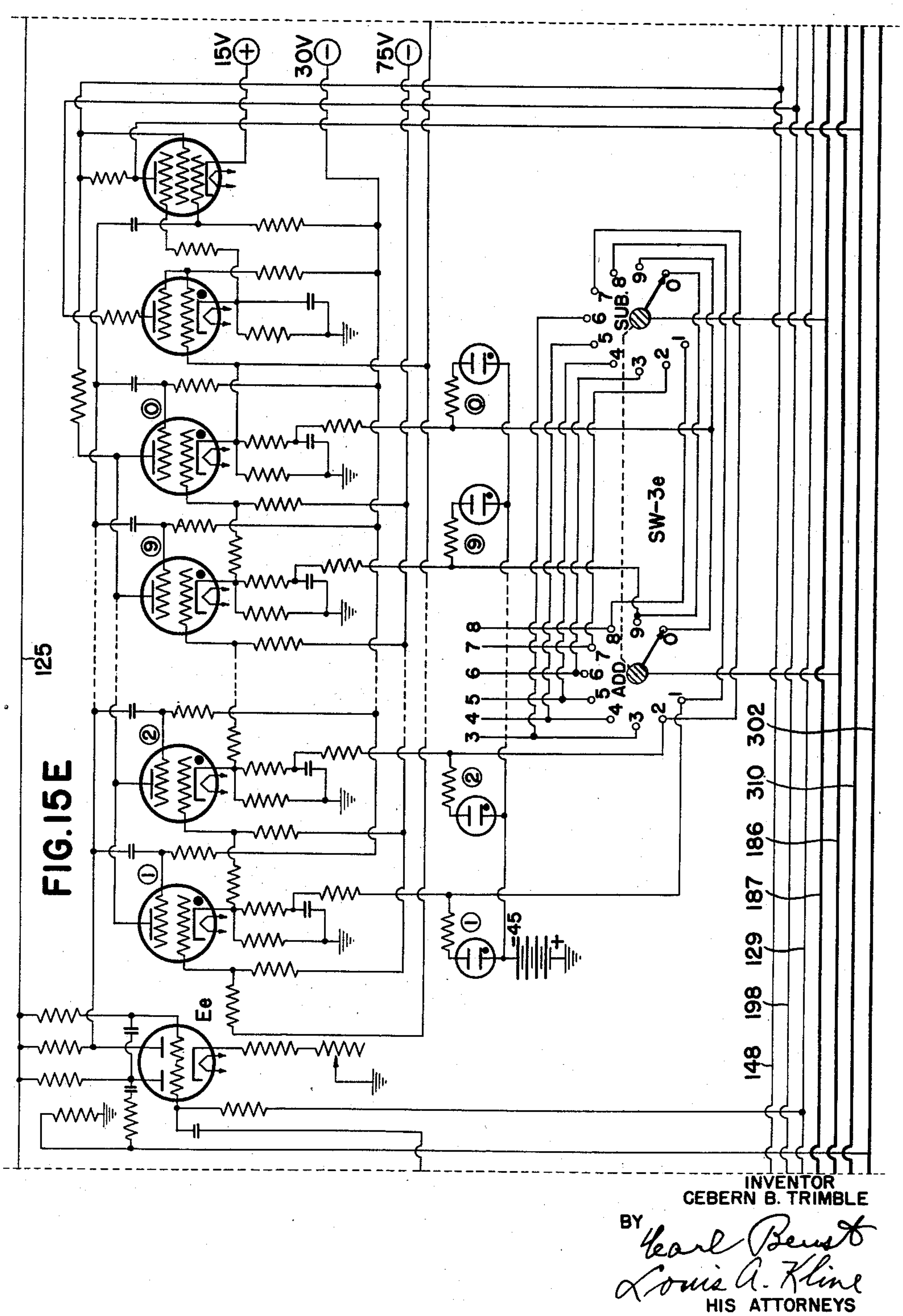
Figure 15F:
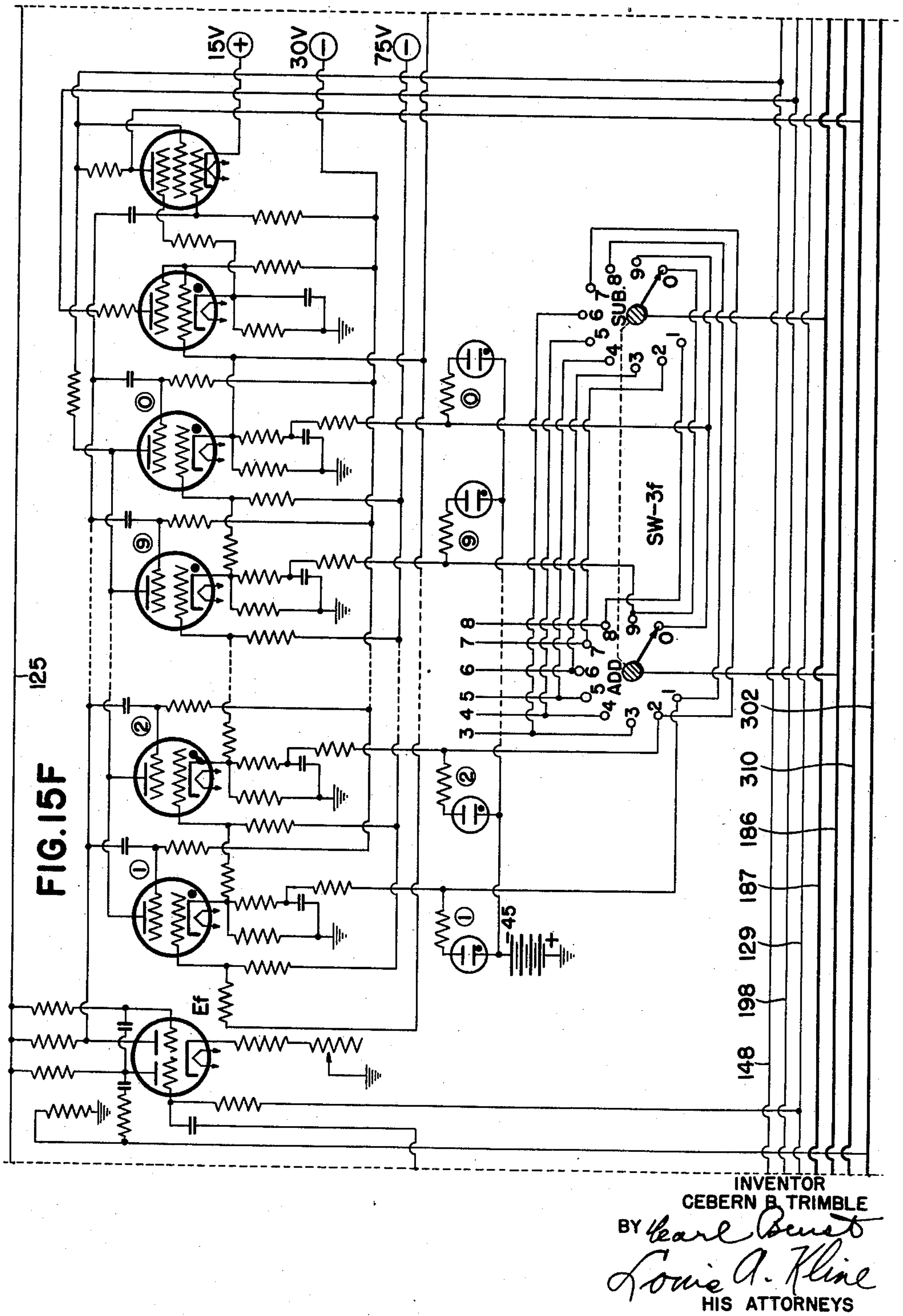
Figure 15G:
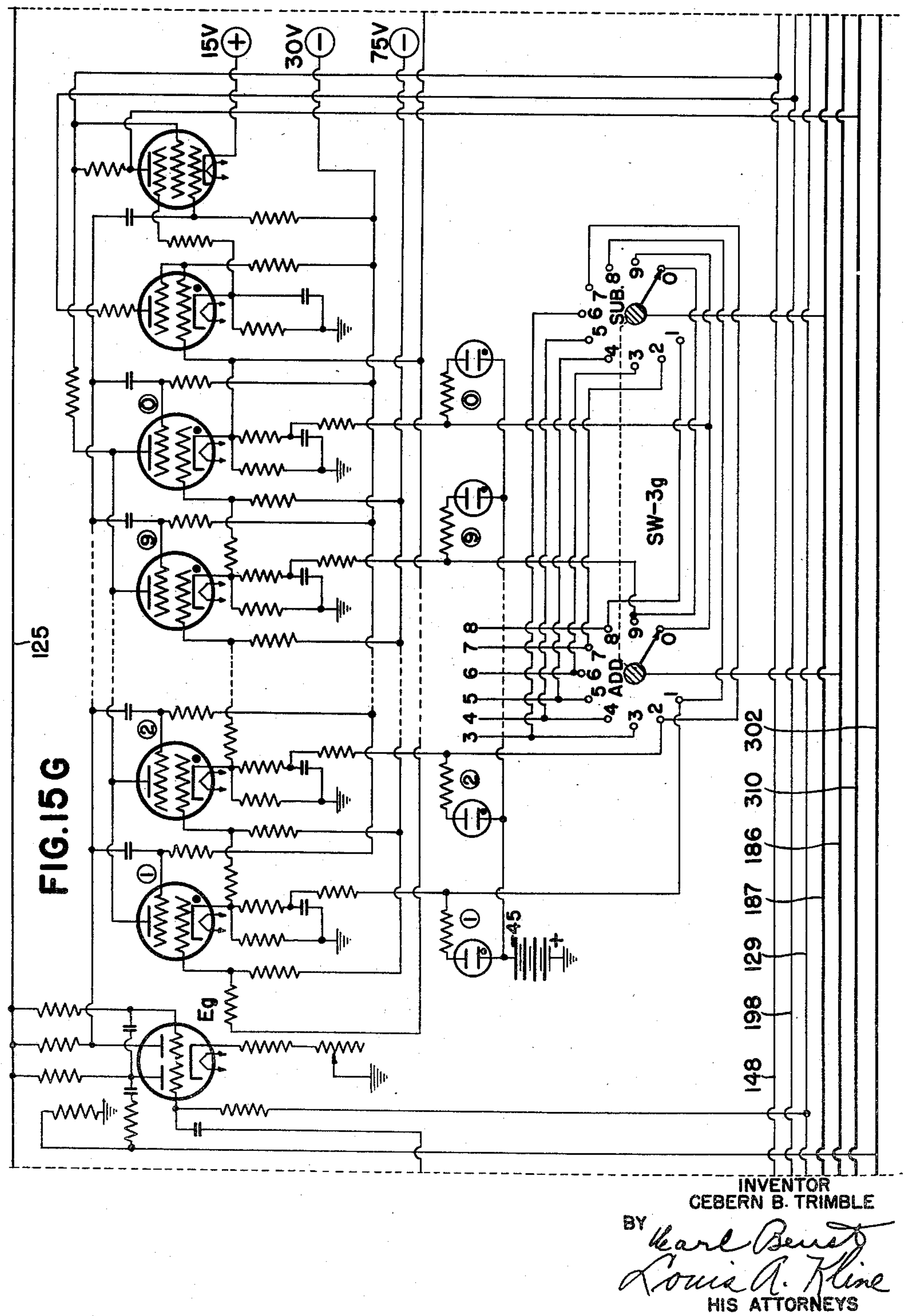
Figure 15H:
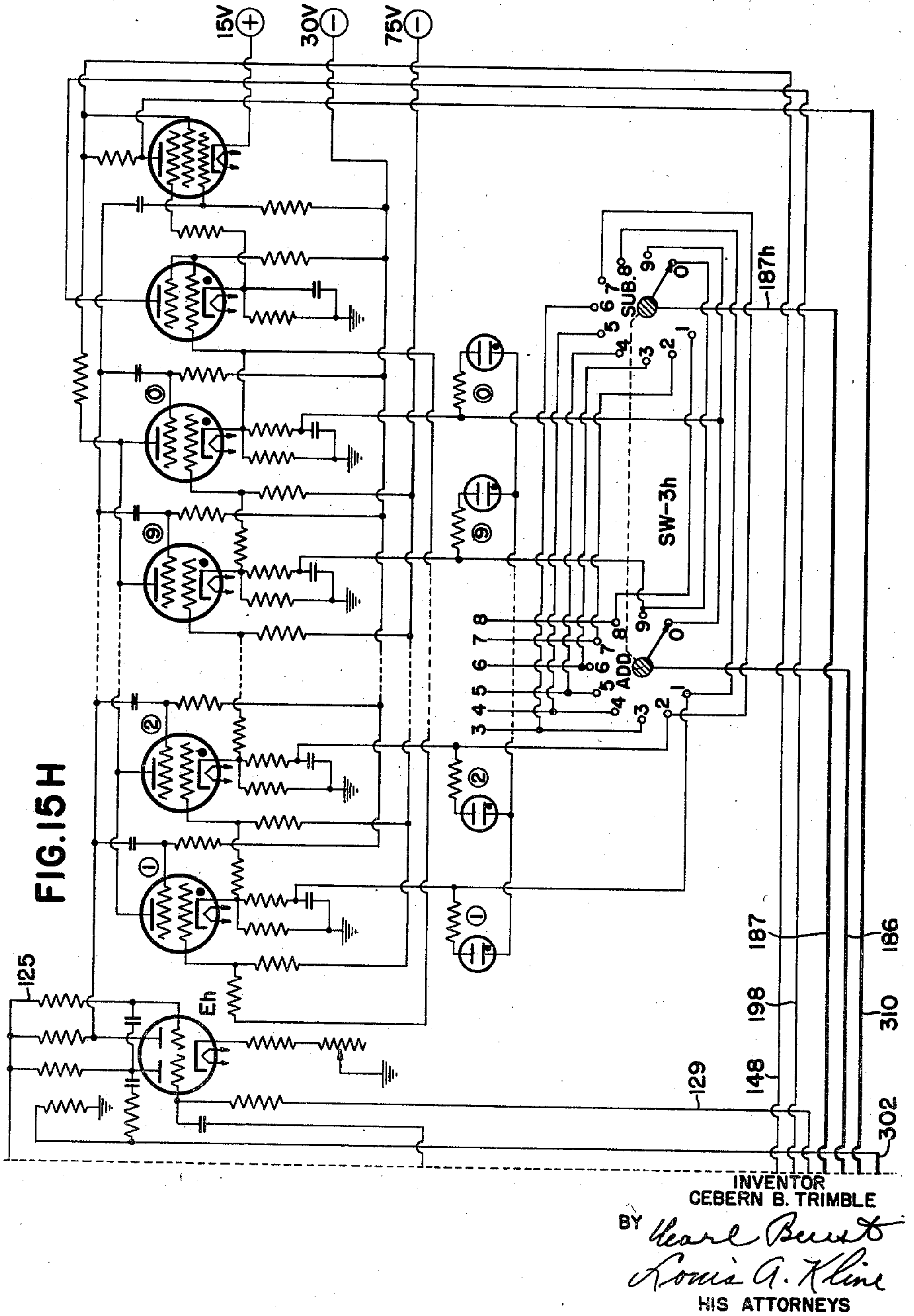
Figure 15J:
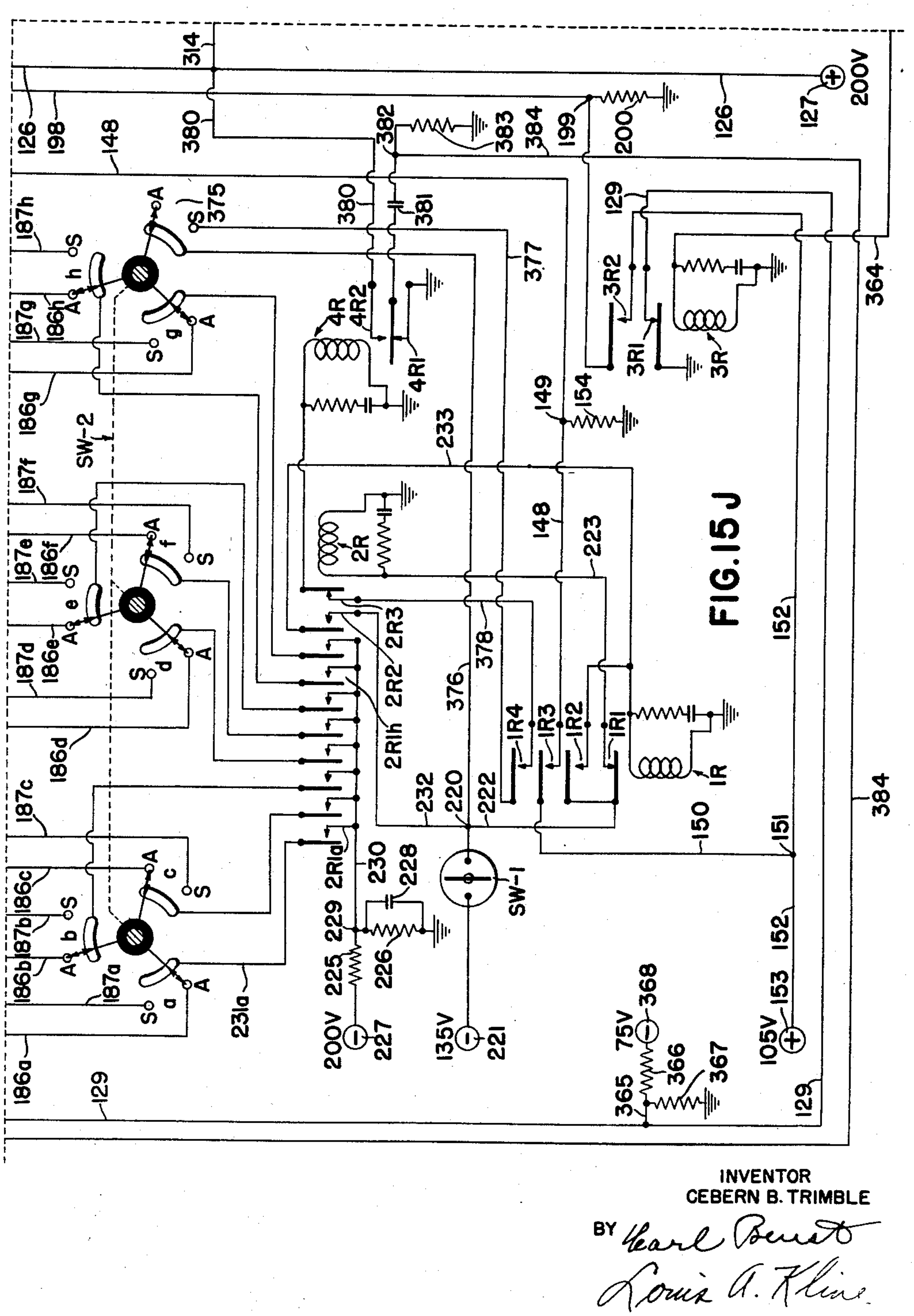

Since the several denominational orders of the accumulator have the same construction and mode of operation, an understanding of how all are constructed and operate will be clear from a description of one; for instance, the one shown in Fig. 15A, which shows the units denminational order of the accumulator and its related parts.

The denominational order of the accumulator includes an entry device E*a*; a gaseous tetrode counting ring including a tube for each of the digits "1" through "9" and "0"; an amount-indicating glow tube for each tube of the ring; and a control tube 120 and a gate tube 121, which are controlled from the ring and are effective to control the recording of an amount standing in this order of the accumulator on the storage element during an amount-storing operation.

The entry device E*a* is a twin triode sold by Radio Corporation of America under the type designation 6J6 and is connected to operate as a flip-flop to furnish positive impulses to the ring in response to either positive or negative impulses applied to the entry device.

The left section 122 of the entry device E*a* is normally non-conducting. Its anode is connected over point 123 and resistor 124, of 51,000 ohms, to an anode potential supply conductor 125, which is connected over conductor 126 (Figs. 15A and 15J) to terminal 127, to which a potential of +200 volts is applied. Its grid is normally at ground potential, being connected to ground over resistor 128, of 10,000 ohms, conductor 129 (Figs. 15A and 15J), and normally closed contact 3R1 of relay 3R.

The cathode, which is common to the two sections of the entry device, is connected to ground over resistor 130, of 3,000 ohms, and a portion of the variable resistor 131, of 3,000 ohms. Due to normal conduction in the right section of the entry device, the cathode normally will be more positive than ground to provide the necessary bias to render the left section normally non-conducting.

The right section 135 of the entry device E*a* is normally conducting. It has its anode connected over point 136 and resistor 137, of 51,000 ohms, to the anode potential supply conductor 125 and has its control grid connected to this conductor over point 138 and resistor 139, of 1.5 megohms. Point 138 is coupled over capacitor 140, of 1,000 micromicrofarads, to point 123 in the anode circuit of the left section. Negative impulses on point 123, due either to negative impulses applied thereto or to conduction in the left section of the entry device, will cause the right section to become non-conducting momentarily to produce corresponding positive impulses at point 136 in the anode circuit of the right section. These positive impulses are used to drive the counting ring and also are used to cause the amount on the accumulator to be stored on the storage element, as will be explained hereinafter.

The counting ring is substantially like the ring shown in the Gulden United States Patent No. 2,515,448, which issued on July 18, 1950. Since the circuit arrangement for each of the digit-representing tubes of the ring is the same, the tubes for the digits "3" through "8" and their related circuits have been omitted from Figs. 15A to 15H to simplify the drawings. An understanding of the operation of the ring can be had from the digit-representing tubes for the digits "1," "2," "9," and "0," which have been shown.

The digit-representing tubes of the ring are gaseous tetrodes, such as those sold by General Electric Company under the type designation GL5663, and each tube contains an anode, a cathode, a heater, a control grid, and a shield grid. The heater elements are shown diagrammatically in the circuit diagram.

Where the circuit elements are repetitive, reference numbers are applied only to those elements associated with the "0" tube to avoid confusion.

The anodes of the tubes of the ring are connected together and to a source of anode potential over a resistor 145, of 5,000 ohms, conductor 146, point 147, conductor 148, point 149, contact 1R3, when relay 1R has been energized, conductor 150, point 151, and conductor 152 to terminal 153, to which a potential of +105 volts is applied. Point 149 in this circuit is connected to ground over a resistor 154, of 100,000 ohms.

Each cathode is connected to ground from a point, as 157, through a resistor 158, of 20,000 ohms, shunted by a circuit over a resistor 159, of 2,500 ohms, point 160, and capacitor 161, of 5,000 micro-microfarads in series. Point 157 is also connected to a —75-volt terminal 162 over conductor 163, point 164, conductor 165, resistor 166, of 1 megohm, point 167, resistor 168, of 1.5 megohms, and conductor 169. This circuit normally provides the cathode with a slight negative potential; however, when conduction occurs in the tube, the cathode is conductively coupled to the anode, and this causes the potential of the cathode to become quite positive.

The control grid of the "1" tube, which is the next tube in sequence in the ring, is connected to point 167 in the negative potential supply circuit for the cathode of the "0" tube and normally is given a potential sufficiently more negative than the cathode of the "1" tube to provide a bias for the "1" tube and prevent conduction therein; however, as the potential of the cathode of the "0" tube becomes more positive, when the "0" tube conducts, this change in potential will be reflected on the control grid of the "1" tube to reduce the bias to prime the tube to enable it to respond to input impulses. Accordingly, as each tube of the ring becomes conducting, it will prime the next tube for operation.

The shield grid of the "0" tube is connected over point 175, resistor 176, of 1 megohm, and conductor 177 to terminal 178, to which a potential of —30 volts is applied; and is coupled over point 175 and capacitor 179, of 10 micro-microfarads, to input conductor 180, which is connetced to point 136 in the anode circuit of the right section 135 of the entry device E*a* and has a positive impulse impressed thereon each time the entry device operates. Each of the positive impulses on the input conductor 180 will be impressed on the shield grids of all the digit-representing tubes but will be effective to fire only that tube whose control grid has been primed by conduction in the preceding tube in the ring. Accordingly, as input impulses are applied to the ring, they will cause the primed tubes to fire one after another in succession.

The act of conduction commencing in any tube in the ring is utilized to cause any previously conducting tube to be extinguished. As explained earlier herein, the cathode of a conducting tube will be more positive than any other cathode of the ring. When another tube in the ring is fired, its cathode-capacitor, as 161, will hold the cathode of that tube momentarily against change and will cause the potential of all the anodes, due to resistor 145, to drop below the potential of the cathode of the previously conducting tube to extinguish conduction therein.

The potential rise of the cathode of the "0" tube, as that tube becomes conducting, is also used to cause a tens transfer entry to be made in the next higher order, the cathode of the "0" tube in the units denominational order (Fig. 15A) being connected over point 157, conductor 163, point 164, conductor 181 (Figs. 15A and 15B), and capacitor 182, of 50 micro-microfarads, to the grid of the left section 183 of the entry device E*b* in the tens denominational order to cause an entry of "one" to be made in the tens order each time the "0" tube is fired when the units order exceeds its capacity. Further, the potential rise of the cathode of the "0" tube is used to fire the control tube 120 in read-out operations, as will be explained more fully hereinafter.

Amounts can be preset in the accumulator in the following manner. The several stator contacts of the "add" portion of the amount entry control switch SW–3*a* (Fig. 15A) of the units order are connected over conductors, as **184*a*, and resistors, as 185*a*, of 100,000 ohms, to points, as 160, in the cathode circuits of the corresponding digit-representing tube of the accumulator. A negative potential applied to the rotor of the switch over conductor 186*a* of cable 186 (Figs. 15A to 15H), which contains conductors 186*a* to 186*h*, will be applied over the stator contact selected by the position of the switch and over conductor, as 184*a***, to the cathode of the related tube of the ring. This application of negative potential to the cathode will reduce the bias effect of the control grid of the tube to a point where the tube will fire and become conducting. The conducting condition of the preset tube of the ring will prime the next tube of the ring to enable it to respond to input impulses which may be applied thereto.

The "Subtract" portion of the amount entry control switch SW–3*a* has its stator contacts, which correspond to the amount setting of the switch, connected to conductors, as **184*a*, having a value which is the "nines" complement of the amount to which the switch is set. Accordingly, when negative potential is applied to conductor 187*a* of cable 187, which contains 187*a* to 187*h***, the tube in the ring which has the value of the "nines" complement of the amount set on the switch will be rendered conducting.

An indicating glow lamp, as 190 (Fig. 15A), is provided for each of the tubes of a ring to indicate whether or not the related tube of the ring is conducting. A circuit extends from point 191 on conductor **184*a* over resistor 192, of 100,000 ohms, and conductor 193 to the negative side of a 45-volt battery, which is grounded at its positive side. When the tube of the ring is not conducting and its cathode is slightly negative with respect to ground, the voltage across the glow lamp 190** will be insufficient to cause conduction therein, but, when the related tube in the ring conducts and its cathode becomes more positive, then the glow lamp will conduct to provide an indication of the value standing in that order of the accumulator.

The control tube 120 and the gate tube 121 are rendered operable in an amount-storing operation in which an amount in the accumulator is to be stored on the element and are effective to control the reading and recording head 46 to make the required number of magnetic spots on the storage element according to the amount standing in the accumulator.

Control tube 120 is a gaseous tetrode of the GL5663 type noted above. Normally this tube cannot operate due to the fact that anode potential is withheld therefrom; however, in an amount-storing operation, anode potential of +105 volts is applied over resistor 195, of 30,000 ohms, conductor 196, point 197, conductor 198 (Figs. 15A and 15J), point 199, contact 3R2 of relay 3R, which will have been closed at this time, and conductor 152 to terminal 153, to which a potential of +105 volts is applied. Point 199 in this circuit is connected to ground over a resistor 200, of 1 megohm.

The cathode of control tube 120 is connected to ground over point 205 and resistor 206, of 150,000 ohms, shunted by capacitor 207, of 5,000 micro-microfarads.

The shield grid and the control grid of the control tube 120 are connected together and over the resistor 208, of 1 megohm, to conductor 177, to which the potential of —30 volts is applied, and are given a bias which normally prevents conduction in the tube. The control grid is also coupled over capacitor 209, of 100 micro-microfarads, to point 157 in the cathode circuit of the "0" tube and has a positive impulse impressed thereon each time the "0" tube becomes conducting. This positive impulse will cause the control tube 120 to begin conducting if anode potential is being supplied thereto at the time. Once rendered conducting, the tube will remain conducting until anode potential is removed therefrom at relay 3R.

The gate tube 121 is a vacuum pentode of the type sold by Western Electric Company under the type designation 6AS6. The anode of this tube is supplied with a potential of +105 volts by being connected over point 210 and resistor 211, of 47,000 ohms, to conductor 146, which, as explained earlier, is connected to terminal 153 (Fig. 15J). The screen grid of this tube is also given a positive potential by being directly connected to conductor 146.

The cathode of the gate tube 121 is given a slight positive potential by being directly connected to terminal 212, to which a potential of +15 volts is applied.

The supressor grid of tube 121 is connected over a resistor 213, of 47,000 ohms, to point 205 in the cathode circuit of tube 120 and will be at ground potential when tube 120 is non-conducting. When tube 120 is conducting, its cathode will have a positive potential, and this will cause the suppressor grid of tube 121 to become more positive.

The control grid of tube 121 is connected over a resistor 214, of 1 megohm, to conductor 177, which has —30 volts applied thereto from terminal 178, and is coupled over a capacitor 215, of 25 microfarads, to the input conductor 180 for the ring.

When control tube 120 is non-conducting and the suppressor grid of gate tube 121 is in its less positive condition, the impulses on the input conductor 180 will not cause tube 121 to conduct, but, when the tube 120 is conducting and the suppressor grid of tube 121 is in its more positive condition, the impulses on the input conductor will be effective to cause tube 121 to conduct momentarily for each impulse applied thereto and to produce impulses at its anode which can be used to cause magnetic marks to be made on the storage element. The tubes 120 and 121 act as a gate which is controlled by the ring in an amount-recording operation to control which ones of the impulses on conductor 180 will be passed on to the reading and recording head 46 to cause magnetic spots to be made on the storage element.

Apparatus and circuits similar to the ones described above for the units denominational order are also provided for the other seven denominational orders of the accumulator, as shown in Figs. 15B to 15H.

Also provided in the novel apparatus are an input impulse amplifier and shaping means for amplifying and shaping signals produced by the heads in reading operations and an output impulse amplifier and shaping means for amplifying and shaping signals which are sent to the reading and recording head to record amounts on the storage elements.

Figure 15K:
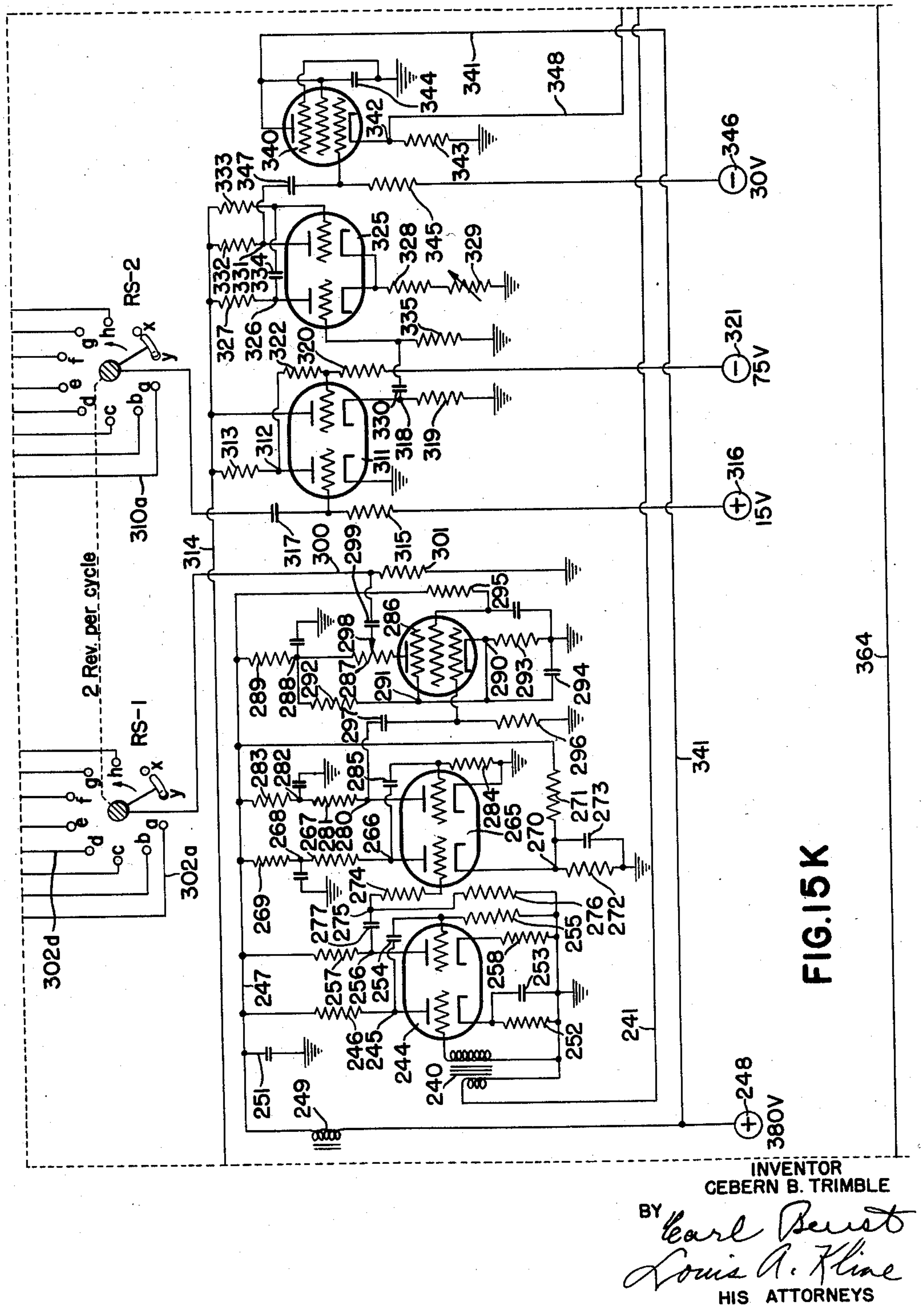
Figure 15L:
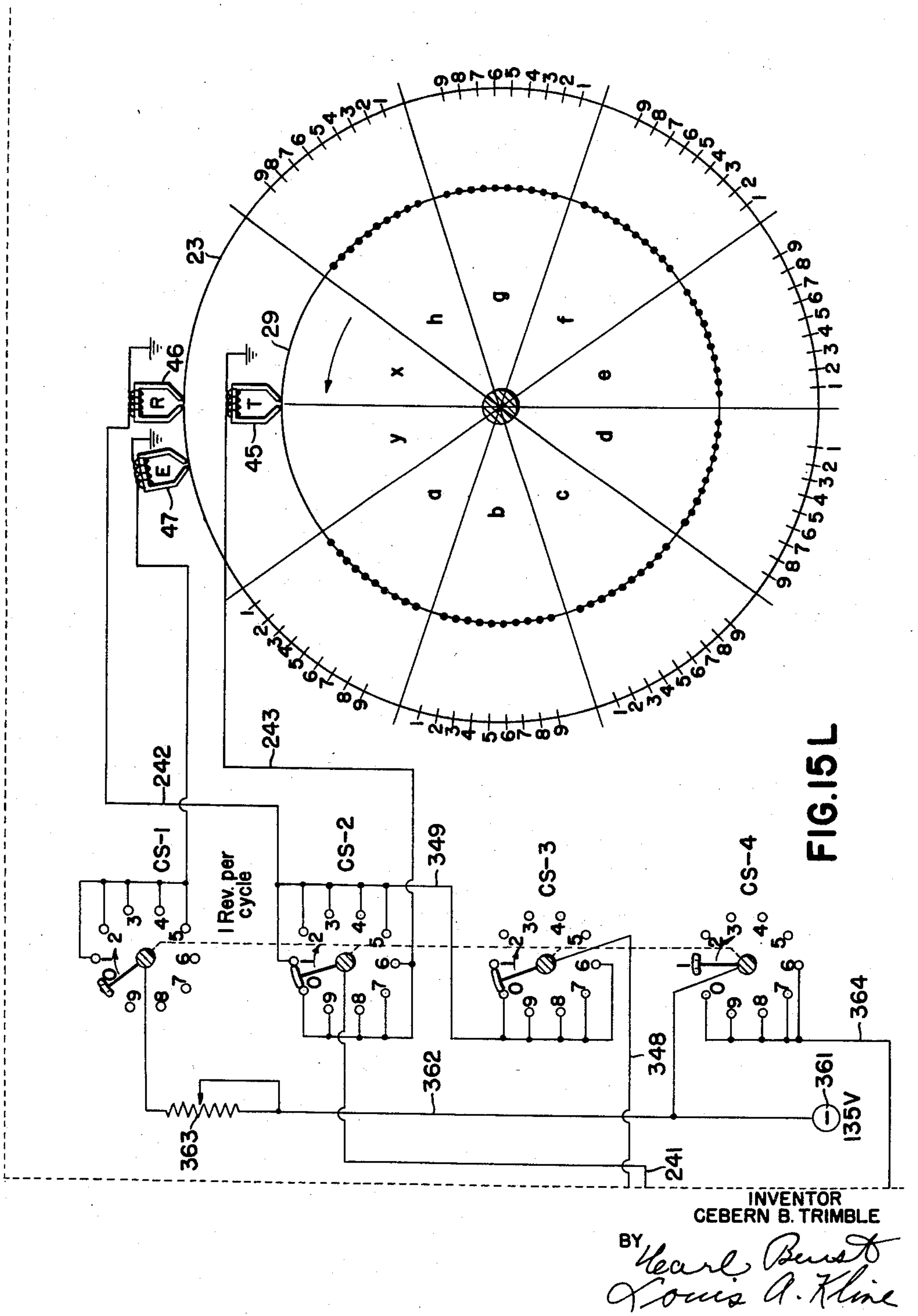

The input impulse amplifier and shaping means is shown in Fig. 15K. The input to the input amplifier and shaping means is over an impedance matching transformer 240, whose primary is connected over control switch CS–2 (Fig. 15L) to the reading and recording head 46 during the first rotation of the cylinder 15 and to the read-out impulse generator head 45 during the second rotation of the cylinder. This circuit extends from ground, over the primary of the transformer 240, conductor 241, wiper of switch CS–2, contacts 1 to 5 on the stator of the switch during the first rotation of the cylinder 15, conductor 242, and winding of reading and recording head 46 to ground. During the second rotation of the cylinder, switch CS–2 will connect the primary of the impedance matching transformer over the contacts 6 to 0 on the stator, conductor 243, and winding of readout impulse generator head 45 to ground. As the magnetic spots on the respective storage elements pass these heads, the voltage generated in the heads for each spot will cause a positive and negative signal at the primary of the transformer. The first two stages of the input impulse amplifier and shaping means operate as a regular two-stage cascaded straight amplifier and are provided by the left and right sections of a twin triode 244 of the type sold by Radio Corporation of America under the type designation 6SN7, the left section being the first stage and the right section being the second stage.

The impedance matching transformer, which is of the step-up type with a ratio of about 50 to 1, has one end of its secondary connected to ground and the other connected to the control grid of the left section of twin triode 244. The anode of this section is connected over point 245 and resistor 246, of 250,000 ohms, to an anode potential supply conductor 247, which has a potential of +380 volts supplied thereto at terminal 248. The connection of the conductor 247 to the terminal includes an inductance 249 and a capacitance coupling to ground over a 16-microfarad condenser 251, which together act as a low pass filter to isolate and filter sudden variations in potential which might be had from the power supply. The cathode of this section is connected to ground over resistor 252, of 6,800 ohms, shunted by a capacitor 253, of .1 microfarad.

Point 245 in the anode potential supply circuit of the left section is coupled over capacitor 254, of 5,000 micro-microfarads, to the grid of the right section, or second stage, of the amplifier and shaping means, which grid is also connected to ground over a resistor 255, of 1 megohm. The anode of the right section is connected to the anode potential supply conductor 247 over point 256 and resistor 257, of 50,000 ohms, and the cathode of this section is connected to ground over resistor 258, of 10,000 ohms.

The positive and negative signals from the head, which are impressed on the first stage of the amplifier and shaping means, will cause linearly-amplified signals to appear at point 245 in the anode circuit of the first stage, which signals are applied to the grid of the second stage to produce further amplified alternate positive and negative signals.

The third stage is a clipper and limiter stage, and the fourth stage is an overdriven stage, which stages are provided by the left and right sections of a twin triode 265, of the aforementioned 6SN7 type.

The anode of the left section of twin triode 265 is connected to the anode potential supply conductor 247 over point 266, resistor 267, of 35,000 ohms, point 268, and resistor 269, of 5,000 ohms, with point 268 coupled to ground over a .1-microfarad stabilizing capacitor. The cathode of this section is given a positive potential by being connected at point 270 in a potential divider network which extends to ground from anode potential supply conductor 247 over resistor 271, of 60,000 ohms, point 270, and resistor 272, of 12,000 ohms, shunted by capacitor 273, of .1 microfarad.

The control grid of this left section of twin triode 265 is connected to ground over resistor 274, of 100,000 ohms, point 275, and resistor 276, of 100,000 ohms. Point 275 in this grid circuit is coupled over capacitor 277, of 10,000 micro-microfarads, to point 256 in the anode potential supply circuit of the second stage of the amplifier and shaping means.

This left section of twin triode 265, or the third stage, is normally non-conducting, since its cathode is more positive than its grid, and this section, accordingly, will not respond to negative impulses impressed on the grid; however, positive impulses on its grid will drive the section to saturation.

The fourth stage, which uses the right section of the twin triode 265, is an overdriven stage. It has its anode connected over point 280, resistor 281, of 35,000 ohms, point 282, and resistor 283, of 5,000 ohms, to anode potential supply conductor 247, point 282 being coupled to ground over a stabilizing capacitor of .1 microfarad. The cathode of this stage is directly connected to ground, and the grid is connected to ground over resistor 284, of 1 megohm, and is coupled to point 266 in the anode circuit of the third stage over a capacitor 285, of 10,000 micro-microfarads.

The triode of this fourth stage is zero biased and is normally conducting but will be cut off by negative impulses from the third stage and will produce strong positive impulses which are insensitive to variations in input impulses.

The fifth stage utilizes a pentode 286 of the type sold by Radio Corporation of America under the type designation 6AC7. This pentode has its anode connected over resistor 287, of 25,000 ohms, point 288, and resistor 289, of 5,000 ohms, to the anode potential supply conductor 247. Point 288 in this circuit is connected to ground over a stabilizing capacitor of .1 microfarad. The cathode and the suppressor grid are given a slightly positive potential by being connected at points 290 and 291, respectively, in a potential divider circuit extending to ground from point 288 in the anode circuit, over resistor 292, of 100,000 ohms, points 291 and 290, and resistor 293, of 5,000 ohms, shunted by a capacitor 294, of .1 microfarad. The screen grid is connected to the anode potential supply conductor 247 over a resistor 295, of 40,000 ohms, and is coupled to ground over a .1-microfarad capacitor. The control grid of the pentode is connected to ground over resistor 296, of 50,000 ohms, and is coupled over capacitor 297, of 150 micro-microfarads, to point 280 in the anode circuit of the fourth stage.

The positive impulses which are created across the anode resistor of the fourth stage are differentiated and applied to the control grid of the normally non-conducting pentode of the fifth stage, which will cause the pentode to conduct and produce sharp negative impulses across the anode resistor 287 in this stage.

An adjustable potential tapping element 298 cooperates with resistor 287 and is coupled over a capacitor 299, of .1 microfarad, to an output conductor 300, the output conductor being connected over a resistor 301, of 100,000 ohms, to ground and also being connected to the rotor of the routing switch RS–1. Negative impulses thus produced by the input impulse amplifier and shaping means are routed by the routing switch to the various denominations of the accumulator, the connection to the entry device E*a*, for instance, being over conductor 302*a* of cable 302 (Fig. 15A), over point 303, resistor 304, of 47,000 ohms, and capacitor 305, of 1,000 micro-microfarads in series to point 123 in the anode circuit of the left section.

Point 303 in this circuit is also connected to ground over a resistor of 3.9 megohms.

Negative impulses from the output of the input impulse amplifier and shaping means which are applied to point 123 will cause the right section 135 of the entry device E*a* to be effective to produce positive impulses on the conductor 180 and thereby cause the stepping of the ring.

As the routing switch RS–1 is operated, it will direct impulses from the input impulse amplifier and shaping means to proper denominations of the accumulator. During the first rotation of the cylinder, it will direct impulses read from various portions of a storage element to the proper denominations of the accumulator to transfer the stored amount to the accumulator, and, during the second rotation of the cylinder, it will direct the read-out impulses to the proper denominations of the accumulator in amount storage operations.

The output impulse amplifier and shaping means is shown in Fig. 15K. This means will operate in read-out operations and is provided to amplify and shape the signals from the gate tubes (as 121, of the different denominations of the accumulator to enable these signals to produce suitable magnetic spots on the storage elements to store amounts thereon during the second rotation of the cylinder.

In the read-out operation, as the various denominational portions of the selected storage element pass the reading and recording head 46 during the second rotation of the cylinder, points, as 210, in the anode circuit of the various gate tubes, as 121, will be connected over conductors of cable 310, as 310*a* (Figs. 15A and 15K), to corresponding contacts on the stator of routing switch RS–2 and in succession over the wiper of switch RS–2, to the input of the first stage of the output impulse amplifier and shaping means.

The first stage of the output impulse amplifier and shaping means utilizes the left section of a twin triode 311 of the aforementioned type 6SN7. The anode of this section is connected over point 312 and resistor 313, of 50,000 ohms, to anode potential supply conductor 314, which is connected over conductor 126 to terminal 127, which is supplied with a potential of +200 volts. The cathode of this section is connected to ground, and the control grid is connected over resistor 315, of 500,000 ohms, to terminal 316, which is supplied with a potential of +15 volts, and is coupled over capacitor 317, of 5,000 micro-microfarads, to the wiper of the routing switch RS–2. Since the control grid of this section is more positive than the cathode, this section will normally conduct; but negative impulses from points, as 210, in the anode circuits of the gate tubes will drive the section toward cut-off, producing positive excursions at its anode.

The second stage utilizes the right section of twin triode 311. This section is connected to operate as a cathode-follower having its anode directly connected to anode supply conductor 314 and its cathode connected to ground over point 318 and a resistor 319, of 10,000 ohms. The control grid of this section is connected over a resistor 320, of 500,000 ohms, to terminal 321, which is supplied with a potential of −75 volts, and is connected over a resistor 322, of 500,000 ohms, to point 312 in the anode circuit of the first stage. The second stage is normally at cut-off, but positive anode excursions of the first stage will cause the second stage to conduct and produce strong, clean positive impulses at its cathode.

The positive impulses from the cathode of the second stage are differentiated and applied to a flip-flop circuit including the two sections of a twin triode 325 of the aforementioned 6SN7 type. The left section of the twin triode 325 has its anode connected over point 326 and resistor 327, of 31,000 ohms, to the +200-volt anode potential supply conductor 314 and has its cathode connected to ground over resistor 328, of 5,000 ohms, and variable resistor 329, of 3,000 ohms. The control grid of the left section is connected to ground over resistor 335, of 10,000 ohms, and is connected to point 318 in the cathode circuit of the second stage over a capacitor 330, of 100 micro-microfarads.

The right section of the twin triode 325 has its anode connected over point 331 and resistor 332, of 31,000 ohms, has its cathode connected to ground over the same resistors 328 and 329 over which the cathode of the left section is connected to ground, and has its control grid connected to the +200-volt anode potential supply conductor 314 over resistor 333, of 3.8 megohms, and connected over capacitor 334, of 1,000 micro-microfarads, to point 326 in the anode circuit for the left section. Normally, the right section is conducting, and its cathode will have a potential more positive than ground due to the drops across resistors 328 and 329. Since the cathode of the left section has the same potential as that of the right section, conduction in the right section will raise the potential of the cathode of the left section and provide an effective blocking bias for the left section, in which the grid is at ground potential, and will cause the left section to be normally non-conducting.

Each of the positive impulses at the cathode of the second stage, when applied to the control grid of the left section of the twin triode 325, will cause this section to become conducting. The resulting anode drop of the left section is applied over capacitor 334, of 1,000 micro-microfarads, to the control grid of the right section to turn it off. Once the flip-flop is operated from normal, it will remain operated for a predetermined period until the charge on capacitor 334 has dissipated sufficiently to allow the right section to become conducting and apply sufficient bias to the left section to render it non-conducting. The length of time the flip-flop will remain in its operated condition can be controlled by adjusting the variable resistor 329.

The final stage of the output impulse amplifier and shaping means includes a tube 340, which is a pentode of the type sold by Radio Corporation of America under the type designation 6AB7, in a cathode-follower circuit. The anode of tube 340 is supplied with +380 volts by being connected over conductor 341 to terminal 248, and the cathode is connected to ground over point 342 and resistor 343, of 25,000 ohms. Tube 340 has its screen grid connected to its anode and both coupled to ground over capacitor 344, of 20 microfarads, and has its suppressor grid connected directly to ground. The control grid of tube 340 is connected over resistor 345, of 250,000 ohms, to terminal 346, which is supplied with a potential of −30 volts and is coupled over a capacitor 347, of 1 microfarad, to point 331 in the anode circuit of the right section of the twin triode 325 in the flip-flop circuit. Normally, the tube 340 is biased to cut-off but will be made to conduct by a positive impulse sent thereto each time the flip-flop circuit operates from normal condition.

Each time tube 340 conducts, its cathode potential will rise sharply from ground potential to produce strong positive impulses of definite duration at point 342. Point 342 in the cathode circuit is connected over conductor 348, wiper and stator contacts 6 to 0 of switch CS–3 during the second rotation of the cylinder 15, over conductors 349 and 242, and over the winding of the reading and recording head 46 to ground. The head 46 operates as a recording head at this time and produces a discrete magnetic spot on the selected storage element each time the tube 340 conducts in a read-out operation.

*Operation*

The coordination and operation of the various components of the apparatus in performing the problem of adding an amount of 2762 to an amount 3765 which has been stored on one of the storage elements on the cylinder will now be explained in connection with the circuit diagram of Figs. 15A to 15H and 15J to 15L and the sequence chart, Figs. 16A and 16B.

For convenience in explaining the operations of reading amounts from the storage elements and of storing amounts thereon, reference may be had to the diagrammatic showing of the storage element 23 and the read-out impulse generating element 29 in Fig. 15L. In this diagram, the elements have been divided into ten arcs, which subtend the angles "*x*" and "*y*" and also the angles "*a*" through "*h*," which are related to various denominational orders of the amount, and, wherever possible, the contacts of the switches will be given like references.

In the problem being considered, in which 3765 is stored on the selected storage element 23, five magnetic spots will be present in the arc subtending angle "*a*"; six magnetic spots will be present in the arc subtending angle "*b*"; seven spots will be present in the arc subtending angle "*c*"; three spots will be present in the arc subtending the angle "*d*"; and no spots will be recorded in the angles "*e*" through "*h*," which are related to the higher orders of the amount. The arcs subtending angles "*x*" and "*y*," which are the arcs adjacent the heads during the beginning and ending of a rotation of the cylinder, will never have any data recorded thereon.

In the sequence chart, the time the circuit is completed through the winding of a relay is shown by the heavy line; the time when the relay is operated from normal is shown by the elevated portion of the line; and the time when circuits are completed through the various switches is shown by solid lines, and the time when the circuits are open is shown by dotted lines.

As a preliminary to the operation of adding an amount to a stored amount, the support 49 for the reading and recording head 46 and the erasing head 47 is adjusted along the rod 54 to bring these heads into cooperative relation with the storage element 23, on which the amount 3765 has been stored; the "Add-Subtract" switch SW–2 is set in its "Add" position, as shown in Fig. 15J, to connect conductors 186*a*, 186*b* . . . 186*h* of cable 186 to contacts 2R1*a* to 2R1*h* of relay 2R; and the manually-operable amount entry control switches are set to 00002762.

The operation begins with the moving of the "On-Off" switch SW–1 (Fig. 15J) to "On" position, point A in the chart, Fig. 16A, to connect point 220 to terminal 221, to which a potential of −135 volts is applied. A circuit extends to ground from point 220 over conductor 222, normally closed contact 1R1 of relay 1R, conductor 223, and the winding of relay 2R, which is shunted by a 250-ohm resistor and a .1-microfarad capacitor in series. Relay 2R will be nergized over this circuit upon moving the switch SW–1 to its "On" position.

Relay 2R, upon being energized, operates, at point B in the chart of Fig. 16A, and will close contacts 2R1*a* to 2R1*h*, to connect negative potential to corresponding denominational portions of the "Add-Subtract" switch SW–2 and therethrough to the "Add" portions of the manually-operable amount entry control switches, which apply this potential to the cathodes of the tubes of the rings in accordance with the settings of the entry control switches, to prepare these tubes for firing to preset the amount in the accumulator. The circuit to the units order is typical and is as follows. A potential divider (Fig. 15J) containing a resistor 225, of 15,000 ohms, and a resistor 226, of 20,000 ohms, connected between terminal 227, to which a potential of −200 volts is applied, and ground, provides a potential of about −115 volts at point 229 in the divider. Resistor 226 in this divider is shunted by a capacitor 228, of 20 microfarads. This negative potential is applied over conductor 230, contact 2R1*a*, conductor 231*a*, the units denominational portion "*a*" of the "Add-Subtract" switch SW–2, conductor 186*a* of cable 186, the "Add" portion of amount entry control switch SW–3*a*, which, in the problem being considered, is setting at a value of "2," over the corresponding conductor 184*a* and resistor, as 185*a*, to the cathode circuit of the "2" digit-representing tube. This application of negative potential to the cathode through the cathode circuit will prepare the "2" tube to fire and become conducting to preset "2" in the units order when anode potential is supplied thereto. In a similar manner, negative potential will be applied from conductor 230, over other contacts, as 2R1*b* to 2R1*h*, through the other portions of the "Add-Subtract" switch, over wires of cable 186 and respective amount entry control switches to other orders of the accumulator to prepare them for presetting to the value 00002762 when anode potential is supplied thereto.

When relay 2R is operated, it opens contact 2R3 in a circuit which extends to relay 4R for controlling the energization of this relay when a subtractive entry is to be made. The operation of relay 4R will be considered more in detail hereinafter.

Operation of relay 2R also closes contact 2R2, which completes an energization circuit for relay 1R, which circuit extends to ground from point 220, over conductor 232, contact 2R2, conductor 233, and the winding of relay 1R, which winding is shunted by a 250-ohm resistor and a .1-microfarad capacitor in series.

Relay 1R, when energized, operates at point C on the chart of Fig. 16A and closes contacts 1R2, 1R3, and 1R4 and opens contact 1R1.

Contact 1R2 closes a holding circuit for relay 1R from point 220 over conductor 222.

Contact 1R3, when closed, completes the circuit from terminal 153 to the anodes of the tubes of the various rings of the accumulator, as traced previously over conductors 148 and 146, and causes the selected tubes in the various orders to fire and become conducting at point C in the chart of Fig. 16A to preset the value 00002762 in the accumulator.

Contact 1R4 is included in the circuit to relay 4R. Contact 1R4 closes one point in the circuit, which is further controlled to cause relay 4R to operate in subtract operations. Since the instant operation is an add operation, relay 4R will not be energized at this time.

Contact 1R1, when operated at point C in the chart of Fig. 16A, opens the energizing circuit to relay 2R to deenergize this relay. Relay 2R returns to normal at point D on the chart of Fig. 16A, and it will be seen that there is a sufficient delay in the return of relay 2R to normal condition after relay 1R is operated, between points C and D on the chart of Fig. 16A, that anode potential will be applied to the tubes of the ring before the negative potential is removed from the selected cathodes by the opening of contacts, as 2R1*a*, by the return of relay 2R to normal condition; hence the selected tubes will be fired. The operation of the "On-Off" switch SW–1 to "On" position, accordingly, has caused the accumulator to be rendered operable by having anode potential supplied thereto and has caused the tubes in the various orders to be fired to preset the amount 00002762 therein.

The apparatus, which now has the new amount preset in the accumulator, is ready for the entry of the stored amount into the accumulator.

The next operation is to trip the clutch to initiate the two rotations of the cylinder 15 and the related operations of the switches RS–1, RS–2, CS–1, CS–2, CS–3, and CS–4 to cause the stored amount to be cleared from the element 23 and entered into the accumulator during the first rotation of the cylinder 15 and to cause the new total to be stored on the element during the second rotation of the cylinder. This operation of the cylinder 15 can be initiated automatically by having the clutch of the driving means for the cylinder tripped magnetically after relay 2R is released at point D (Fig. 16A), but in the instant embodiment the clutch is tripped by manual operation of the stud 85 (Fig. 1) at point E in the chart.

As the cylinder 15 and the selected storage element thereon begin to rotate, no data is read from the element as its portion which subtends the angle "*x*" moves past the reading point, but the wiper on control switch CS–2 will engage its related contact 1 to couple the reading and recording head 46 to the input impulse amplifier and shaping means, and the wiper of control switch CS–1 (Fig. 15L) will engage its related contact 1 to supply current to the erasing head 47 over a circuit from terminal 361, to which −135 volts is applied, over conductor 362, variable resistor 363, by which the amount of current can be adjusted, switch CS–1, and winding of erasing head 47 to ground.

As the cylinder continues to rotate, the routing switch RS–1 will couple the output of the input impulse amplifier and shaping means to the denominational orders of the accumulator in succession as corresponding portions of the storage element move past the reading head. Since the stored amount is 3765, no entries will be made in the accumulator as the sections of the storage element which subtend the angles "h," "g," "f," and "e" pass the reading head, but the control switches CS–1 and CS–2 will move to engage their number 2 and then their number 3 contacts.

When the portion of the element 23 which subtends the angle "d" passes the reading head 46, the three magnetic spots thereon will generate three signals in the reading and recording head, which signals will be sent over contact 3 and wiper of control switch CS–2 to the input impulse amplifier and shaping means (Fig. 15K), which produces three negative impulses on conductor 300. These three negative impulses are sent over conductor 300, wiper of routing switch RS–1, and "d" contact of the switch, and conductor 302d of cable 302 (Figs. 15B to 15D and 15 K) to the entry device Ed (Fig. 15D) of the thousands denominational order. Each impulse will cause an operation of Ed, which impresses a positive impulse on the input conductor for the ring of this order. Since the ring in this order has been preset to the value of "2," the three steps of operation of the ring will cause a value of "5" to be standing therein, with the "5" digit-representing tube conducting at the end of the entry.

The erasing head 47 engages the storage element in such a manner that it will erase any magnetic spots therefrom soon after they have passed the reading head. Accordingly, as soon as a digit of an amount has been read from the storage element, the magnetic spots by which the digit has been represented will be erased.

Similarly, as the portion of the storage element which subtends the angle "c" passes the reading and recording head 46, the seven spots thereon, which represent the stored digit "7," will be sent via the control switch CS–2, the input impulse amplifier and shaping means, the routing switch RS–1 over its "c" contact, and conductor 302c in cable 302 to the entry device Ec of the hundreds order to cause seven steps of operation of the ring in this order to add seven to the value of seven which was preset therein. At the end of this operation, the "4" tube in this ring will be conducting.

When the third impulse of the seven impulses actuated the ring, it caused the "0" tube to be fired. As this tube is fired, its cathode rise is transmitted over conductor 181 (Figs. 15C and 15D) and capacitor 182 to the left section of the entry device Ed to cause this section of the entry device to conduct and send a negative impulse to the right section, which is cut off, and impresses a positive impulse on the input conductor to cause a step of operation of the ring to enter the tens carry in this order of the accumulator to change the setting thereof from "5" to "6."

As before, the magnetic spots by which the value "7" was stored will be erased from the element soon after they have generated impulses in the reading head.

In a similar manner, as the portions of the storage element which subtend the angles "b" and "a" pass the reading and recording head 46, six impulses will be entered into the ring in the tens order of the accumulator shown in Fig. 15B, and five impulses will be entered in the units order, shown in Fig. 15A. During the entry into the tens denominational order, a tens carry was required and made into the hundreds order.

As the cylinder completes its first rotation, the stored amount, 3765, will have been entered into the accumulator and added to the amount 00002762, which was preset therein, the accumulator containing the sum of these amounts, 00006527, as represented by conduction in appropriate digit-representing tubes in the several denominational rings of tubes.

During the first rotation of the cylinder, the control switches CS–1, CS–2, CS–3, and CS–4 were operated to move their wipers over their contacts 1 through 5. In the last portion of the first rotation and the first portion of the second rotation, when the portion of the element 23 which subtends the angles "y" and "x" passes the reading head and when no amounts are being read from the element, the wiper of the control switch CS–1 passes from its contact 5 to open the circuit to the erasing head 47; the wiper of the control switch CS–2 passes from its contact 5 to its contact 6 to disconnect the reading and recording head 46 from the input amplifier and shaping means and connect the read-out impulse generating head 45 thereto; the control switch CS-3 engages its contact 6 to connect the reading and recording head 46 to the output impulse amplifier and shaping means to enable the head to be operated as a recording head; and control switch CS–4 engages its contact 6 to complete a circuit from −135-volt terminal 361 (Fig. 15L) over conductor 362, switch CS–4, and conductor 364 (Figs. 15L, 15K, and 15J), and winding of relay 3R to ground, to energize relay 3R, to prepare the apparatus for reading the new total from the accumulator and storing it on the storage element during the second rotation of the cylinder.

Relay 3R, when operated, opens contact 3R1 to remove ground from conductor 129, which extends over grid resistors to the control grids of the left section of each of the entry control devices. With this ground connection to conductor 129 opened, a negative potential, which is derived from an intermediate point 365 in a divider including resistors 366 and 367, of 33,000 ohms and 6,150 ohms, respectively, connected between −75-volt terminal 368 and ground, becomes effective to bias the left sections, or transfer sections, of the entry devices of the various denominations of the accumulator to prevent transfer entries from being made during the amount-storing operation.

Contact 3R2 is closed when relay 3R operates and completes the anode potential supply circuit, which supplies +105 volts over conductor 152, contact 3R2, point 199, and conductors 198 and 196 to the anodes of control tubes, as 120, in the several denominational orders of the accumulator to render the control tubes operable under control of the rings to control the storage of amounts on the storage element 23 during the amount-storing operation.

As the cylinder 15 continues to operate and moves the portion of the storage element 23 and the portion of the read-out impulse generating element 29 which subtend the angle "h" past their respective heads, the ten magnetic spots on element 29 will generate ten signals in the head 45, which are transmitted over conductor 243, control switch CS–2, input impulse amplifier and shaping means, and contact "h" of routing switch RS–1 to the entry device Eh of the highest denomination of the accumulator. The ring of this order is standing at zero, with the "0" digit-representing tube conducting, and the ten impulses will drive the ring through a complete cycle, the last impulse firing the "0" tube. The firing of the "0" tube will send an impulse to fire the control tube, as 120, to render the control tubes 120 and the gate tube 121 effective to cause amount recording on the element, but, since the last impulse of the group from the impulse-generating element caused the control tube to be fired, no further impulses will be impressed on the ring, and no impulses will be sent from the gate tube over the contact "h" of routing switch RS–2 to the output impulse amplifier and shaping means and over the control switch CS–3 to the reading and recording head 46, so that no spots will be recorded on this portion of the storage element 23.

Since the next three lower orders of the accumulator, corresponding to the portions of the elements subtending angles "g," "f," and "e," are also standing at zero, the operations which occur when these portions pass the various heads are the same as those explained for the "h" section, above, and no spots will be recorded on these portions of the storage element 23.

The next lower denomination of the accumulator has the value of "six" standing therein, the "6" digit-representing tube being conducting. As the portions of the elements 23 and 29 which subtend angle "*d*" pass their respective heads 45 and 46, ten impulses will be sent to the entry device E*d* of this order of the accumulator, which will impress ten impulses on the input conductor for this order. The first four impulses will fire the tubes "7," "8," "9," and "0," and, when the "0" tube fires, it will fire the control tube, as 120, in this order. The control tube, as 120, when conducting, will make the suppressor grid of its related gate tube, as 121, sufficiently positive that the related gate tube can respond to the remaining impulses of the group on conductor 180. Accordingly, the last six impulses of the group not only will fire the tubes in the ring in succession to return the ring to its starting condition but also will cause six operations of the related gate tube, as 121, to produce six impulses at its anode. The point, as 210, in its anode circuit will be connected over conductor 310*d* of cable 310 and the "*d*" contact of routing switch RS–2 to the output impulse amplifier and shaping means (Fig. 15K), which will operate in response to each of the six impulses. Impulses from the output impulse amplifier and shaping means will be sent over conductor 348 (Figs. 15K and 15L), control switch CS–3, conductors 349 and 242 to the reading and recording head 46, which will make a magnetic spot on the storage element 23 for each of the six impulses.

In this recording operation, therefore, the ten impulses from the read-out impulse generating means will have caused the ring in this order of the accumulator to have operated from a starting condition completely around the ring to its starting condition and will have caused six magnetic spots to have been made on the portion of the storage element 23 which subtends the angle "*d*," to store the value "6" thereon.

As the cylinder 15 continues its second rotation, the values standing on the three lowest orders of the accumulator will be recorded on the portions of storage element 23 which subtend the angles "*c*," "*b*," and "*a*."

During the rotation of the cylinder to move the portion which subtends the angle "*y*" past reading position, the circuit to relay 3R will be opened (see point F in the chart, Fig. 16B) by control switch CS–4.

When the cylinder completes its second rotation, the clutch will be disengaged to stop further rotation. At this time, the number 6527 will have been stored on the selected storage element 23 with six spots recorded on that portion thereof which subtends the angle "*d*," with five spots recorded on that portion thereof which subtends angle "*c*," with two spots recorded on that portion which subtends angle "*b*," and with seven spots recorded on that portion which subtends angle "*a*."

The accumulator will remain in operation with the new total 00006527 registered therein when the cylinder comes to rest. The final step in the operation is to move the "On-Off" switch SW–1 to "Off" position, point G on the chart, Fig. 16B, which opens the circuit to relay 1R and allows this relay to return to its normal condition, opening the anode potential supply circuit for the tubes of the accumulator to erase the new total therefrom.

The apparatus is now in condition for further adding or subtracting operations.

The operation of subtracting an amonut from a stored amount is very similar to the operation of adding amounts described above.

As an example of a subtracting operation in which a new amount is subtracted from a stored amount, the problem of subtracting the new amount, 2763, from a stored amount, 4624, will be considered.

In preparation for the subtracting operation, the shifting of the reading and recording head 46 and the erasing head 47 into cooperation with the desired storage element on which the amount 4624 has been stored and from which the new amount is to be subtracted, and the setting of the amount entry control switches SW–3 to the amount to be subtracted, 00002763, are the same as in the addition operation described above, but the "Add-Subtract" switch SW–2 is set in its "Subtract" position.

The "On-Off" switch SW–1 is next set in its "On" condition to cause relays 2R and 1R to operate to preset an amount in the accumulator. In the operation of subtraction, however, the "nines" complement of the amount on the amount entry control switches, or 99997326, is preset in the accumulator, and, in addition thereto, a value of "one" is entered automatically in the units order of the accumulator after the complement has been preset therein and before the cylinder is set in operation.

The means by which the complement is preset in the accumulator and the value of "one" is automatically added thereto will now be considered.

In its "Subtract" position, the "Add-Subtract" switch connects conductors, as 231*a*, which extend from contacts 2R1*a* to 2R1*h* of relay 2R, to conductors 187*a* to 187*h* of cable 187, which extend to the "Subtract" portion of the related amount entry control switches, which portion of each switch has its stator contacts connected to the cathodes of the tubes of the ring which have a value that is the "nines" complement of the amount set on the switch. Accordingly, when relays 2R and 1R have been operated after the "On-Off" switch has been set to its "On" position, those tubes in the various denominational rings will be fired which correspond to 99997236, the "nines" complement of the set-up amount, thereby presetting the accumulator to this complementary amount.

Portion 375 of the "Add-Subtract" switch SW–2 (Fig. 15J) is effective in a "subtract" operation to enable the relay 4R to operate and cause the value of "one" to be entered in the lowest order of the accumulator. The circuit for relay 4R extends from point 220, over conductor 376, portion 375 of "Add-Subtract" switch SW–2 in "Subtract" position, conductor 377, contact 1R4, conductor 378, contact 2R3, and to ground over the winding of relay 4R, which is shunted by a 250-ohm resistor in series with a .1-microfarad capacitor. This circuit will be completed when relay 2R returns to normal and closes contact 2R3 after relay 1R has been operated to close contact 1R4 (point D on the chart, Fig. 16A), and the relay 4R will be energized to open contact 4R1 and close contact 4R2.

Contact 4R2, when closed, applies +200 volts from conductor 126 over conductor 380 to one side of a capacitor 381, of 150 micro-microfarads, the other side of the capacitor being connected over point 382 and resistor 383, of 10,000 ohms, to ground. The closing of contact 4R2 causes a positive impulse to appear at point 382, which impulse is transmitted over conductor 384 (Figs. 15J and 15A) and capacitor 385, of 50 micro-microfarads, to the control grid of the left section 122 of the entry device E*a* to cause the left section to conduct and transmit a negative impulse to the right section to cut off conduction in the right section, which in turn produces a positive impulse on conductor 180 to fire the "7" tube, thereby entering the value of "one" in this order.

With the "nines" complement preset on the accumulator and with the value of "one" added thereto, the apparatus is ready for the next operation, which is that of tripping the clutch to start the two rotations of the cylinder. During the two rotations of the cylinder, the operations are the same as for addition, explained above. The stored amount, 4624, is read from the selected storage element during the first rotation of the cylinder and entered in the proper denominations of the accumulator, where it is added to 99997237, standing therein, to form the new total or difference 00001861. During the second rotation of the cylinder, this new total in the accumulator is read out and stored on the storage element.

At the end of the operation of the cylinder, the "On-Off" switch SW–1 is returned to its "Off" position, which causes relay 1R to return to its normal condition to remove anode potential from the rings of the accumulator and causes relay 4R to be deenergized to allow contact 4R1 to reclose and discharge capacitor 381.

The apparatus is now ready for a further operation.

The operation by which the stored amount on any storage element is ascertained is similar to the adding operation described earlier herein. The reading and recording head 46 and the erasing head 47 are positioned in cooperative relation with the storage element, the "Add-Subtract" switch SW–2 is set to its "Add" position, the manually-operable amount entry control switches SW–3 are set to 00,000,000, and the "On-Off" switch SW–1 is set to its "On" position to preset the accumulator to zero in each order. The clutch is then tripped to start the two rotations of the cylinder. During the first rotation of the cylinder, the amount stored on the selected element will be read therefrom and entered into proper denominations of the accumulator, which has been preset to zero. The amount standing in the accumulator at the end of the first rotation of the cylinder will be the stored amount, and this can be read from the indicator lights, as 190, in the several orders. During the second rotation of the cylinder, the amount on the accumulator will be restored on the storage element. After the cylinder has completed its second rotation and the amount which was transferred to the accumulator has been ascertained, the "On-Off" switch SW–1 can be moved to "Off" position to clear the accumulator of this amount.

The amount stored on any storage element can be cleared therefrom by placing the reading and recording head 46 and the erasing head 47 in cooperative relation with the element and tripping the clutch without moving the "On-Off" switch to its "On" position to render the accumulator operable. As the stored amount is read and erased in the first rotation of the cylinder, the accumulator will not be operated by the signals and consequently will not have any amount thereon at the end of the first rotation of the cylinder. In the second rotation of the cylinder, the groups of ten impulses will have no effect on the accumulator, so that the control and gate tubes, as 120 and 121, in the various orders will not be made effective, and no magnetic spots will be recorded on the storage element, thereby leaving the storage element cleared and without any amount stored thereon.

In all the above types of operation, the apparatus operates very rapidly to obtain the results.

While the form of the invention herein illustrated and described is admirably adapted to fulfill the objects primarily stated, it is to be understood that it is not intended to confine the invention to the one form or embodiment herein disclosed, for it is susceptible of embodiment in various other forms.

What is claimed is:

1. In a device of the class described, the combination of an electronic accumulating device including a plurality of electron discharge devices and circuits interconnecting the discharge devices for counting action, the discharge devices, by their conducting conditions, representing digits of a notation; means settable to represent digits; first circuit means connecting the settable means to the discharge devices corresponding to the various digits that may be set thereon, said settable means by its setting selecting the circuits which will be operable to cause the discharge devices corresponding to the various set digits to become conducting; second circuit means connecting the settable means to the discharge devices corresponding to the complements of the various digits that may be set thereon, said settable means, by its setting, selecting the circuits which will be operable to cause the discharge devices corresponding to the complements of various set digits to become conducting; and means to supply potential selectively to said first or said second circuit means to render the selected circuit means operable to cause conduction in the discharge devices according to the set amount or its complement.

2. In a device of the class described, the combination of a plurality of electron discharge devices, one device for each of the digits of a notation; circuits for supplying operating and bias potentials to the discharge devices and for connecting the discharge devices for sequential operation to accumulate the amounts, the discharge devices by their operation representing digits; a direct firing conductor connected to each discharge device; differentially settable digit entry control means having one portion for selecting the firing conductor to the discharge device for the digit corresponding to the digit which is set on the control means and having another portion for selecting the firing conductor to the discharge device for the digit corresponding to the complement of the digit set on the control means; and means to impress a firing potential momentarily selectively on one or the other of said portions, as desired, and thence over the firing conductor selected by the selected portion to cause the selected discharge device to be fired and provide a direct entry of the set digit or its complement.

3. In a device of the class described, the combination of a multi-denominational order electronic accumulator including a plurality of tubes in each denominational order and circuits interconnecting the tubes of each order for counting, the tubes, by their conducting conditions, representing the digits of an amount; means settable to represent digits of an amount; first circuit means connecting the settable means to the digit-representing tubes of the accumulator according to the amount set on the settable means and, when operable, causing the tubes of the accumulator to become conducting to preset the accumulator to the amount set on the settable means; second circuit means connecting the settable means to the digit-representing tubes of the accumulator according to the complement of the amount set on the settable means and, when operable, causing the tubes of the accumulator to become conducting to preset the accumulator to the amount corresponding to the complement of the amount set on the settable means; and means to apply firing potential selectively to the first or second circuits to render the selected circuit means operable to directly fire tubes in various orders to preset the accumulator to the set amount or its complement, as desired.

4. In a device for presetting amounts in an accumulator as an incident to adding and subtracting operations, the combination of a denominational order bank of electronic devices, one device for each digit of a notation, and circuits for supplying operating and bias potentials and for connecting the devices of a bank for sequential operation to accumulate amounts; a differentially operable switch settable to represent digits of the notation and having two switching portions; circuits connecting one portion of the switch to tubes of the bank which correspond to the values of the settings of the switch to enable the switch to select the desired one of the tubes for firing in adding operations; circuits connecting the other portion of the switch to tubes of the bank which correspond in values to the "nines" complement of the values set on the switch to enable the switch to select the desired one of these tubes for firing in subtracting operations; add-subtract control means to select which portion of the switch will be effective to control the selection of the tube to be fired according to whether the setting is to be for addition or subtraction; and means operating through the add-subtract control means to impress a firing potential momentarily on the selected portion of the switch and thence over the related circuit to the selected tube to overcome the normal bias and cause the selected tube to be fired.

5. In a device for directly setting amounts in an accumulator, the combination of a denominational order bank of electronic devices, including one device for each digit of a notation and circuits for supplying operating and bias potentials and for connecting the devices of a bank in a ring for sequential operation to accumulate amounts; a manually operable switch settable to represent digits of the notation and having two switching portions; circuits connecting one portion of the switch to tubes of the ring which correspond to the values of the settings of the switch to enable the switch, according to its setting, to select a desired one of the tubes for firing; circuits connecting the other portion of the switch to tubes of the ring which correspond in values to the "nines" complement of the values set on the switch to enable the switch, according to its setting, to select a desired one of the tubes for firing; further means to select which portion of the switch will be effective to control the selection of the tube to be fired; means to impress a firing potential momentarily on the selected portion of the switch and thence over the related circuit to the selected tube to overcome over normal bias and cause the selected tube to be fired; and means connected to the further means to be conditioned for operation when said further means selects the other portion of said switch and connected to the means to impress the firing potential to be controlled thereby to operate after the firing potential has been removed from the tubes, to enter a value of "one" in the ring after the "nines" complement has been set therein.

6. In a device for directly presetting multi-digit amounts in an accumulator, the combination of a multi-denominational order accumulator having in each order a bank of electronic devices, one device for each digit of a notation, and circuits for supplying operating and bias potentials and for connecting the devices of a bank for sequential operation to accumulate amounts; a differentially operable switch related to each bank and settable to represent digits of the notation and having two switching portions; circuits connecting one portion of the switch to tubes of the related bank which correspond to the value of the settings of the switch to enable the switch to select these tubes for firing; circuits connecting the other portion of the switch to tubes of the related bank which correspond in value to the "nines" complement of the values set on the switch to enable the switch to select these tubes for firing; further means to select which portion of the switches will be effective to control the selection of the tubes to be fired in the related banks; means to impress a firing potential momentarily on the selected portion of each of the switches and thence over the related circuits to the selected tubes to overcome the normal bias and cause these tubes to be fired; means controlled by the further selecting means to be effective when said other portions of the switches have been selected and further controlled by the impressing means to operate after the firing potential has been withdrawn from the selected portions, to automatically enter a value of "one" in the lowest denomination of the accumulator whenever a "nines" complement has been directly set therein, whereby to change the complement in the order having the lowest significant digit and orders to the right thereof to the "tens" complement.

7. In a device of the class described, the combination of an elongate storage element of magnetizable material on which digits of a multi-denominational amount can be stored, in predetermined denominationally-related portions of its length, in the form of discrete magnetic marks; a reading head cooperating with the storage element to read the stored amount and produce signals corresponding to the amount as the element moves past the head; means to drive the element past the head; a multi-denominational amount-retaining register operable in response to the signals corresponding to the amount read by the head; and routing means operable in synchronism with the storage element for connecting the head to various denominational orders of the register to route the signals thereto and enter digits of the amount therein as corresponding denominational portions of the element move past the head, whereby the digits that are read can cause corresponding denominational orders of the register to be operated to enter the stored amount therein.

8. In a device of the class described, the combination of an elongate storage element of magnetizable material on which digits of a multi-denominational amount can be stored in predetermined denominationally related portions of its length in the form of corresponding numbers of discrete magnetic marks; a reading head cooperating with the storage element to read the stored amount as the element moves past the head by producing a signal for each of the magnetic marks on the record; means to drive the element past the head; a multi-denominational amount-retaining register operable step-by-step in response to signals produced by the head; and routing means operable in synchronism with the storage element for connecting the head to various denominational orders of the register to enter digits therein as corresponding denominational portions of the element move past the head, whereby various numbers of signals, which are produced as denominational portions of the element are read, can operate corresponding denominational orders of the register to set up the stored amount therein.

9. In a device of the class described, the combination of an elongate storage element of magnetizable material on which digits of a multi-denominational decimal amount can be stored in predetermined denominationally related portions of its length in the form of corresponding numbers of discrete magnetic marks; a reading head cooperating with the storage element to read the stored amount as the element moves past the head by producing a signal for each of the magnetic marks on the record; an erasing means cooperating with the storage element to erase the magnetic marks of each stored digit soon after that digit has been read; means to drive the element past the head and the erasing means; a multi-denominational amount-retaining register operable in response to signals produced by the head; and routing means operable in synchronism with the storage element for connecting the head to various denominational orders of the register to enter digits therein as corresponding denominational portions of the element move past the head, whereby various numbers of signals, which are produced as denominational portions of the element are read, can operate corresponding denominational orders of the register to enter the stored amount therein and the stored digits can be cleared from the storage element.

10. In a device of the class described, the combination of an elongate storage element of magnetizable material on which digits of a multi-denominational amount can be stored in predetermined denominationally related portions of its length in the form of discrete magnetic marks; a reading head cooperating with the storage element to read the stored amount as the element moves past the head by producing a signal for each of the magnetic marks on the record; means to drive the element past the head; a multi-denominational accumulator operable in response to signals produced by the head; means connected to the accumulator and operable to preset therein an amount to be added to the stored amount; and routing means operable in synchronism with the storage element for connecting the head to various denominational orders of the register to enter digits therein as corresponding denominational portions of the element move past the head, whereby the signals, which are produced as denominational portions of the element are read, can operate corresponding denominational orders of the accumulator to add the stored amount to the amount which is preset therein.

11. In a device of the class described, the combination of an elongate storage element of magnetizable material on which digits of a multi-denominational amount can be stored in predetermined denominationally related portions of its length in the form of discrete magnetic marks; a reading head cooperating with the storage element to read the stored amount as the element moves past the head by producing a signal for each of the magnetic marks on the record; means to drive the element past the head; a multi-denominational accumulator operable in response to signals produced by the head; amount entry means connected to the accumulator and operable directly to preset therein an amount to be added to the stored amount or the complement of an amount to be subtracted from the stored amount; means to control whether the amount or the complement will be preset in the accumulator; and routing means operable in synchronism with the storage element for connecting the head to various denominational orders of the register to enter digits therein as corresponding denominational portions of the element move past the head, whereby the signals, which are produced as denominational portions of the element are read, can operate corresponding denominational orders of the accumulator to add the stored amount to the amount or the complement of the amount which is preset therein.

12. In a device of the class described, the combination of an elongate storage element of magnetizable material on which digits of a multi-denominational amount can be stored in the form of magnetic marks in predetermined denominationally related portions of its length; a magnetic head cooperable with the storage element and when energized capable of making a magnetic mark thereon; means to drive the element past the head; a multi-denominational accumulator including in each order a plurality of electron tubes, an input circuit, and circuits for supplying anode-cathode and bias potentials and for connecting the tubes in a ring for step-by-step sequential operation in response to impulses, the various conducting conditions of the tubes representing digits; means to generate a plurality of groups of impulses, one group for each denominational order of the accumulator, and the impulses of a group causing the tubes of a ring to operate from any digit-representing condition completely around the ring and back to the starting data-representing condition; routing means operable in synchronism with the movement of the element past the head for routing the groups of impulses from the generating means to the input circuits of proper denominations of the accumulator in succession as related denominational portions of the storage element are driven past the head; control means for each order of the accumulator connected to the input circuit and to a predetermined tube of the ring of its related order and rendered operable to pass further impulses of the group after the predetermined tube in that order conducts during the operation of the ring by the group of impulses; and switching means operable in synchronism with the routing means for connecting the magnetic head to the control means of the orders in succession as the related denominational portion of the element is passing the head to enable the head to be energized by each of the impulses passed by the control means to thereby make a corresponding number of marks in the proper denominational portion on the storage element.

13. In a device of the class described, the combination of an elongate storage element of magnetizable material on which digits of a multi-denominational amount can be stored in the form of magnetic marks in predetermined denominationally related portions of its length; a magnetic head cooperable with the storage element and when energized capable of making a magnetic mark thereon; means to drive the element past the head; a multi-denominational accumulator including in each order a plurality of electron tubes, an input circuit, and circuits for supplying anode-cathode and bias potentials and for connecting the tubes in a ring for step-by-step sequential operation in response to impulses, the various conducting conditions of the tubes representing digits; means to cause tubes in the accumulator to conduct to represent digits of an amount; means to generate a plurality of groups of impulses, one group for each denominational order of the accumulator, and the impulses of a group causing the tubes of a ring to operate from any digit-representing condition completely around the ring and back to the starting data-representing condition; routing means operable in synchronism with the movement of the element past the head for routing the groups of impulses from the generating means to the input circuits of proper denominations of the accumulator in succession as related denominational portions of the storage element are driven past the head; control means for each order of the accumulator connected to the input circuit and to a predetermined tube of the ring of its related order and rendered operable to pass further impulses of the group after the predetermined tube in that order conducts during the operation of the ring by the group of impulses; and switching means operable in synchronism with the routing means for connecting the magnetic head to the control means of the orders in succession as the related denominational portion of the element is passing the head to enable the head to be energized by each of the impulses passed by the control means to thereby make a corresponding number of marks in the proper denominational portion of the storage element.

14. In a device of the class described, the combination of an elongate storage element of magnetizable material on which digits of a multi-denominational amount can be stored in the form of magnetic marks in predetermined denominationally related portions of its length; a magnetic head cooperable with the storage element and when energized capable of making a magnetic mark thereon; means to drive the element past the head; a multi-denominational accumulator including in each order an electron tube for each of the digits 0 to 9, an input circuit, and circuits for supplying anode-cathode and bias potentials and for connecting the tubes in digital sequence in a ring for step-by-step sequential operation in response to impulses, the conducting condition of a digit tube representing that digit; means to cause digit tubes in the several rings corresponding to the digits of an amount to conduct and provide a representation of an amount; means to generate a plurality of groups of ten impulses, one group for each denominational order of the accumulator, and the ten impulses of a group causing the tubes of a ring to operate from any digit-representing condition completely around the ring and back to the starting data-representing condition; routing means operable in synchronism with the movement of the element past the head for routing the groups of impulses from the generating means to the input circuits of proper denominations of the accumulator in succession as related denominational portions of the storage element are driven past the head; control means for each order of the accumulator connected to the input circuit and to the "0" tube of the ring of its related order and rendered operable to pass further impulses of the group after the "0" tube in that order conducts during the operation of the ring by the group of impulses; and switching means operable in synchronism with the routing means for connecting the magnetic head to the control means of the orders in succession as the related denominational portions of the element move past the head to enable the head to be energized by each of the impulses passed by the control means to thereby make a corresponding number of marks in the proper denominational portions on the storage element.

15. In a device of the class described, the combination of an elongate storage element of magnetizable material on which digits of a multi-denominational amount can be stored in the form of magnetic marks is predetermined denominationally related portions of its length; a magnetic head cooperable with the storage element and, when energized, being operable to make a magnetic mark thereon; means to drive the element past the head;

a multi-denominational accumulator including in each order an electron tube for each of the digits "0" to "9," an input circuit, and circuits for supplying anode-cathode and bias potentials and for connecting the tubes in digital sequence in a ring for step-by-sep operation in response to impulses, the conducting condition of a tube representing the corresponding digit; means to generate a plurality of groups of ten impulses, one group for each denominational order of the accumulator, and the impulses of a group causing the tubes of a ring to operate from any digit-representing condition completely around the ring through "0" and back to the starting digit-representing condition; routing means operable in synchronism with the movement of the element past the head for routing the groups of impulses from the generating means to the input circuits of proper denominations of the accumulator in succession as related denominational portions of the storage element are driven past the head; a control tube for each order of the accumulator; anode-cathode and bias potential supplying circuits for each control tube, said anode-cathode potential supply circuit including an impedance in the cathode leg thereof by which the cathode becomes more positive when the tube conducts; means connecting each control tube to the "0" tube of the ring of its related order to be rendered operative when the "0" tube operates; a gate tube for each control tube; anode-cathode and bias potential supply circuits for each gate tube, said anode-cathode supply circuits containing an impedance for producing an impulse each time the gate tube operates; means connecting the gate tubes to the input conductors and to the cathode of the control tubes of their related orders, said control tubes, when operated, priming their related gate tubes to allow them to respond to input impulses of the group after the "0" tube in that order conducts during the operation of the ring by the group of impulses; and switching means operable in synchronism with the routing means for connecting the magnetic head to the gate tubes of the orders in succession as the related denominational portions of the element pass the head to enable the head to be energized by each of the impulses produced by the gate tubes to thereby make a corresponding number of marks in the proper denominational portions on the storage element.

16. In an apparatus of the class described, the combination of a multi-denominational amount retaining means; a plurality of elongate storage elements of magnetizable material, on each of which elements a multi-denominational amount may be stored in the form of distinctive magnetization in denominational portions of its length; means to drive the elements through two cycles of operation; reading means selectively cooperable with any desired one of said elements and rendered operable during the first of said cycles to read the amount stored on the selected element; means coupling the reading means to the amount retaining means to enter the read amount therein; erasing means cooperable with the selected element and rendered operable during said first cycle to erase a stored amount after it has been read, thereby to clear the storage element; and recording means selectively cooperable with any desired storage element and rendered operable during said second cycle under control of the amount retaining means to magnetize the storage element to store the amount standing in the amount retaining means.

17. In an apparatus of the class described, the combination of a multi-denominational amount retaining means; a plurality of elongate storage elements of magnetizable material, on each of which elements a multi-denominational amount may be stored in the form of distinctive magnetization in denominational portions of its length; means to drive the elements through two cycles of operation; reading means selectively cooperable with any desired one of said elements and rendered operable during the first of said cycles to read the amount stored on the selected element; means coupling the reading means to the amount retaining means to enter the read amount therein; erasing means cooperable with the selected element and rendered operable during said first cycle to erase a stored amount after it has been read, thereby to clear the storage element; recording means selectively cooperable with any desired storage element and rendered operable during said second cycle under control of the amount retaining means to magnetize the storage element to store the amount standing in the amount retaining means; and means operable after said second cycle for controlling the operation of the retaining means to clear the retaining means of any amount therein.

18. In an apparatus of the class described, the combination of a multi-denominational order accumulating means; means to preset the accumulating means to an amount; a plurality of elongate storage elements of magnetizable material, on each of which elements a multi-denominational amount may be stored in the form of distinctive magnetization in denominational portions of its length; means to drive the elements through two cycles of operation; reading means selectively cooperable with any desired one of said elements and rendered operable during the first of said cycles to read the amount stored on the selected element; means coupling the reading means to the accumulating means to enter the read amount therein and add it to the preset amount; erasing means cooperable with the selected element and rendered operable during said first cycle to erase a stored amount after it has been read, thereby to clear the storage element; recording means selectively cooperable with any desired storage element and rendered operable during said second cycle under control of the accumulating means to magnetize the storage element to store the amount standing in the amount retaining means; and means operable after said second cycle for controlling the operation of the accumulating means to clear the accumulating means.

19. In an apparatus of the class described, the combination of a multi-denominational order accumulating means; means to preset an amount in said accumulating means; an elongate storage element of magnetizable material on which a multi-denominational amount may be stored in the form of distinctive magnetization in denominational portions of its length; a magnetic head cooperable with the element; means to drive the element past the head through two continuous cycles of operation; means operable during the first cycle of operation thereof to control the head to enable the head to read a stored amount, digit by digit; routing means operable in timed relation to the movement of the element for connecting the head to the accumulating means, order by order, as corresponding denominational portions of the element move past the head to enable the stored amount to be entered into the accumulating means as it is read from the storage element and added therein to the preset amount; erasing means cooperable with the element and rendered operable during the said first cycle of operation to erase the previously stored amount, digit by digit, after it has been read, thereby to clear the storage element; means for controlling the head to render it operable as a recording means during the second cycle; switching means operable in timed relation to the movement of the element to connect the head and its recording control means to the accumulating means during the second cycle as the corresponding denominational portions of the element pass the head to enable the head to be controlled by the various orders in succession to magnetize the cleared element to store the amount which has been accumulated in the accumulating means; and readout means for controlling the operation of the accumulator while the head and the recording control means are connected to various orders thereof to enable the accumulator to control the amount that is to be recorded according to the amount standing therein.

20. In an apparatus of the class described, the combination of data-retaining means into which data can be entered; a plurality of individually selectable elongate storage elements of magnetizable material on which data may be stored in the form of distinctive magnetization; a magnetic head; means to mount the elements and the head for relative movement to enable the elements and the head for relative movement to enable the head to cooperate with any desired one of the elements; means to drive the elements through two continuous cycles of operation to move the selected element past the head; means cooperable with the head to render it operable during the first cycle of operation thereof to read stored data from the selected element; means connecting the head to the data-retaining means to enter the read data into the data-retaining means as it is read from the storage element; erasing means mounted adjacent the head to be cooperable with the selected element, and rendered operable during said first cycle of operation to erase stored data after it has been read, thereby to clear the selected storage element; and means to control the head to operate as a recording means during the second cycle under control of the data-retaining means to magnetize the cleared element to store thereon data which was retained in the data-retaining means.

21. In an apparatus of the class described, the combination of a multi-denominational order accumulating means; means to preset an amount in said accumulating means; an elongate storage element of magnetizable material on which a multi-denominational amount may be stored in the form of distinctive magnetization in denominational portions of its length; a magnetic head cooperable with the element; means to drive the element past the head through two cycles of operation; means operable during the first cycle of operation thereof to control the head to enable the head to read a stored amount from the element, digit by digit; means connecting the head to the accumulating means, order by order, as corresponding denominational portions of the element move past the head to enter the stored amount into the accumulating means as it is read from the storage element to be added therein to the preset amount; erasing means cooperable with the element and rendered operable during said first cycle of operation to erase the stored amount, digit by digit, after it has been read, thereby to clear the storage element; and read-out means for controlling the head to render it operable as a recording means during the second cycle under control of the accumulating means to magnetize the cleared element to store the amount which has been accumulated in the accumulating means.

22. In an apparatus of the type in which a new amount can be added to or subtracted from a stored amount, the combination of a multi-denominational order accumulating means; means selectively operable to preset the accumulator to the new amount if it is to be added to the stored amount or to preset the accumulator to the complement of the new amount if it is to be subtracted from the stored amount; an elongate storage element of magnetizable material on which a multi-denominational amount may be stored in the form of distinctive magnetization in denominational portions of its length; a magnetic head cooperable with the element; means to drive the element past the head through two continuous cycles of operation; means cooperable with the head and rendered operable during the first cycle of operation thereof to control the head to enable the head to read a stored amount from the element, digit by digit; means connecting the head and its reading control means to the accumulating means, order by order, as corresponding denominational portions of the element move past the head to enable the stored amount to be entered into the accumulating means as it is read from the storage element and added therein to the preset amount; erasing means cooperable with the element and rendered operable during said first cycle of operation to erase the stored data after it has been read, thereby to clear the storage element; and read-out means for controlling the head to render it operable as a recording means during the second cycle under control of the accumulating means to magnetize the cleared element to store the amount which has been accumulated in the accumulating means.

23. In an apparatus of the type in which a new amount can be added to or subtracted from a stored amount, the combination of a multi-denominational order accumulating means; means selectively operable to preset the accumulator directly to the new amount if it is to be added to the stored amount or to preset the accumulator directly to the complement of the new amount if it is to be subtracted from the stored amount; a rotatable cylinder; a plurality of individually selectable elongate storage elements of magnetizable material carried in spaced relation thereon, each of said elements being capable of storing a multi-denominational amount in the form of distinctive magnetization in denominational portions of its length; a magnetic head; means for supporting the head for movement relative to the cylinder so that the head can be moved into operative relation with any desired one of the storage elements to select that element from which a stored amount is to be read; means to drive the cylinder through two rotations to drive the selected element in the direction of its length through two cycles of operation past the head; means for controlling the head to operate as a reading head during the first cycle of operation to enable the head to read the stored amount, digit by digit; routing means connecting the head and its reading control means to the accumulating means, order by order, as corresponding denominational portions of the selected element move past the head to enable the stored amount to be entered into the accumulating means and added to the amount preset therein; erasing means supported for movement with the head into cooperative relation with the selected storage element and rendered operable during said first cycle of operation to erase stored data after it has been read, thereby to clear the storage element; means for controlling the head to render it operable as a recording means during the second cycle; read-out means operable in the second cycle for controlling the accumulator to enable the amount in the accumulator to be read for storage; and switching means to connect the head and its recording control means to various orders of the accumulating means in succession during the second cycle as corresponding denominational portions of the element pass the head to enable the head to be controlled by the various orders during the read-out operation to magnetize the cleared element to store the amount which has been accumulated in the accumulating means.

24. In an apparatus of the class described, the combination of a multi-denominational amount accumulating means; means to preset an amount in the accumulating means; a plurality of elongate storage elements of magnetizable material, on each of which elements a multi-denominational amount may be stored in the form of distinctive magnetization in denominational portions of its length; means to drive the elements through two cycles of operation; reading means selectively cooperable with any desired one of said elements and rendered operable during the first of said cycles to read the amount on the selected element; means coupling the reading means to the amount accumulating means to enter the read amount therein and add it to the preset amount; erasing means cooperable with the selected element and rendered operable to erase a stored amount after it has been read thereby to clear the storage element; and recording means cooperable with the selected storage element and rendered operable during said second cycle under control of the amount accumulating means to magnetize the cleared storage element to store thereon the total standing in the amount accumulating means.

References Cited in the file of this patent

UNITED STATES PATENTS

| | | |
|---|---|---|
| 2,080,100 | Tauschek | May 11, 1937 |
| 2,254,933 | Bryce | Sept. 2, 1941 |
| 2,279,018 | Wolfe | Apr. 7, 1942 |
| 2,307,965 | Shepherd | Jan. 12, 1943 |
| 2,359,617 | Bryce | Oct. 3, 1944 |
| 2,381,463 | Potter | Aug. 7, 1945 |
| 2,404,697 | Desch et al. | July 23, 1946 |
| 2,416,445 | Jensen | Feb. 25, 1947 |
| 2,431,739 | Eilenberger | Dec. 2, 1947 |
| 2,475,694 | Camras | July 12, 1949 |
| 2,501,126 | Howell | Mar. 21, 1950 |
| 2,502,360 | Williams | Mar. 28, 1950 |
| 2,509,012 | Morrison | May 23, 1950 |
| 2,513,683 | Shaper et al. | July 4, 1950 |
| 2,514,035 | Dickinson | July 4, 1950 |
| 2,539,556 | Steinberg | Jan. 30, 1951 |
| 2,540,654 | Cohen et al. | Feb. 6, 1951 |
| 2,546,850 | Chancenotte | Mar. 27, 1951 |
| 2,549,071 | Dusek et al. | Apr. 17, 1951 |
| 2,560,474 | Potts | July 10, 1951 |
| 2,561,476 | Lang | July 24, 1951 |
| 2,564,403 | May | Aug. 14, 1951 |
| 2,568,932 | Rajchman et al. | Sept. 25, 1951 |
| 2,569,827 | Paulsen | Oct. 2, 1951 |
| 2,575,708 | Glick | Nov. 20, 1951 |
| 2,581,765 | Mann et al. | Jan. 8, 1952 |
| 2,583,983 | Arndt et al. | Jan. 29, 1952 |
| 2,587,532 | Schmidt | Feb. 26, 1952 |
| 2,588,925 | Hecht | Mar. 11, 1952 |
| 2,597,001 | Jaffe | May 29, 1952 |
| 2,608,346 | Hopkins | Aug. 26, 1952 |
| 2,609,143 | Stibitz | Sept. 2, 1952 |
| 2,609,439 | Marshall et al. | Sept. 2, 1952 |
| 2,611,813 | Sharpless et al. | Sept. 23, 1952 |
| 2,617,704 | Mallina | Nov. 11, 1952 |
| 2,624,507 | Phelps | Jan. 6, 1953 |
| 2,652,554 | Williams | Sept. 15, 1953 |

OTHER REFERENCES

Predetermined Counters, John J. Wild; "Electronics," March 1947, pp. 120–123.

Proc. of the IRE, August 1947, "Electronic Computing Circuits of the ENIAC," by Burks, pages 756 to 767.

5th Interim Progress Report, January 1, 1949, Inst. for Advanced Study, Princeton (pages VIII–1 to VIII–6, and Diagrams I and II opposite page VIII–3, total of 7 pages).

A Magnetic Digital Storage System, A. D. Booth; "Electronic Engineering," July 1949, pp. 234–238.

"24 Digit Parallel Computer With Magnetic Drum Memory," by Engineering Research Associates, 1949, pages 7 to 9, and 23 to 35; Figures 3.2–1, 3.2–2, 3.3–4, 3.3–5, 3.3–7, 3.3–8, 3.3–9, 3.3–10, 3.3–11, 3.4–1, 3.4–2, 3.4–4, 3.4–5, 3.4–6, 3.4–7.

"Mathematical Tables and Other Aids to Computation," January 1950, pages 31 to 39.

UNITED STATES PATENT OFFICE

CERTIFICATE OF CORRECTION

Patent No. 2,931,571

April 5, 1960

Cebern B. Trimble

It is hereby certified that error appears in the printed specification of the above numbered patent requiring correction and that the said Letters Patent should read as corrected below.

Column 9, line 62, for "Severally" read -- Several --; line 75, strike out "dis-"; column 11, line 25, for "denminational" read -- denominational --; column 12, line 56, for "connetced" read -- connected --; column 13, line 42, after "contains" insert -- conductors --; column 18, line 27, for "6AB7" read -- 6AG7 --; column 19, line 36, for "nergized" read -- energized --; column 23, line 64, for "amonut" read -- amount --; column 31, line 5, for "step-by-sep" read -- step-by-step --.

Signed and sealed this 13th day of September 1960.

(SEAL)

ttest:

KARL H. AXLINE ttesting Officer

ROBERT C. WATSON

Commissioner of Patents